United States Patent
Mizoguchi et al.

(10) Patent No.: US 7,876,484 B2
(45) Date of Patent: Jan. 25, 2011

(54) ACTUATOR, OPTICAL SCANNER, AND IMAGE FORMING APPARATUS

(75) Inventors: Yasushi Mizoguchi, Chino (JP); Hirokazu Yamaga, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/825,747

(22) Filed: Jun. 29, 2010

(65) Prior Publication Data

US 2010/0265556 A1 Oct. 21, 2010

Related U.S. Application Data

(63) Continuation of application No. 12/492,690, filed on Jun. 26, 2009, now Pat. No. 7,773,279, which is a continuation of application No. 12/044,076, filed on Mar. 7, 2008, now Pat. No. 7,570,406.

(30) Foreign Application Priority Data

Mar. 12, 2007 (JP) .............................. 2007-062469

(51) Int. Cl.
*G02B 26/08* (2006.01)
(52) U.S. Cl. ............... 359/202.1; 359/224.1; 359/213.1
(58) Field of Classification Search ............... 359/197.1, 359/198.1, 199.1, 199.3, 200.7, 202.1, 212.1, 359/213.1, 214.1, 223.1–226.1
See application file for complete search history.

(56) References Cited

U.S. PATENT DOCUMENTS

| | | | |
|---|---|---|---|
| 6,188,504 B1 | 2/2001 | Murakami et al. | |
| 6,392,776 B1 | 5/2002 | Murakami et al. | |
| 6,803,843 B2 | 10/2004 | Kato et al. | |
| 6,831,765 B2 | 12/2004 | Yasuda et al. | |
| 6,924,915 B2 | 8/2005 | Hirose et al. | |
| 6,949,996 B2 | 9/2005 | Matsumoto et al. | |
| 7,173,747 B2 | 2/2007 | Yasuda et al. | |
| 7,187,483 B1 * | 3/2007 | Orcutt et al. ............. | 359/224.1 |
| 7,277,214 B2 | 10/2007 | Yasuda et al. | |
| 7,362,488 B2 | 4/2008 | Yasuda et al. | |

FOREIGN PATENT DOCUMENTS

| | | |
|---|---|---|
| JP | 08-322227 | 12/1996 |
| JP | 09-243942 | 9/1997 |
| JP | 10-020226 | 1/1998 |
| JP | 2002-307396 | 10/2002 |
| JP | 2002-321198 | 11/2002 |
| JP | 2004-297923 | 10/2004 |

* cited by examiner

*Primary Examiner*—Euncha P Cherry
(74) *Attorney, Agent, or Firm*—Harness, Dickey & Pierce, P.L.C.

(57) ABSTRACT

An actuator includes: a first vibration system including a driving member having a frame shape, and a pair of first axial members each one end of which supports the driving member so as to allow the driving member to rotate about an X-axis; a second vibration system including a movable plate provided inside the driving member, and a pair of second axial members each one end of which supports the movable plate so as to allow the movable plate to rotate about a Y-axis perpendicular to the X-axis; a driving unit including a ferromagnetic member, a coil generating a magnetic field on the ferromagnetic; and a positioning portion that places the ferromagnetic member or the coil symmetrical with respect to an intersection point of the X and Y-axes.

16 Claims, 11 Drawing Sheets

ACTUATOR, OPTICAL SCANNER, AND IMAGE FORMING APPARATUS

This application is a continuation of U.S. patent application Ser. No. 12/492,690 filed on Jun. 26, 2009, which is a continuation of U.S. application Ser. No. 12/044,076 filed Mar. 7, 2008, now U.S. Pat. No. 7,570,406 issued Aug. 4, 2009. This application claims the benefit of Japanese Patent Application No. 2007-062469 filed Mar. 12, 2007. The disclosures of all of the above applications are incorporated herein by reference.

BACKGROUND

1. Technical Field

The present invention relates to an actuator, an optical scanner, and an image forming apparatus.

2. Related Art

An optical scanner is disclosed that scans light two dimensionally and draws images by scanning light in a printer or the like. For example, refer to JP-A-9-243942.

The optical scanner disclosed in JP-A-9-243942 includes a housing, a mirror having a magnet, a super elastic alloy wire that supports the mirror and allow the mirror to oscillate with respect to the housing, and a coil generating an alternating voltage for vibrating the mirror.

In such optical scanner, the mirror having a magnet is bonded (fixed) to the super elastic alloy wire with an adhesive. It is difficult to fix the mirror at a desired position of the super elastic alloy wire in manufacturing the optical scanner. That is, it is difficult that the optical scanner disclosed in JP-A-9-243942 demonstrates desired vibration characteristics.

SUMMARY

An advantage of the invention is to provide an actuator, an optical scanner, and an image forming apparatus that can demonstrate desired vibration characteristics.

The above advantage is attained by the following aspects of the invention.

According to a first aspect of the invention, an actuator includes: a first vibration system including a driving member having a frame shape, and a pair of first axial members each one end of which supports the driving member so as to allow the driving member to rotate about an X-axis; a second vibration system including a movable plate provided inside the driving member, and a pair of second axial members each one end of which supports the movable plate so as to allow the movable plate to rotate about a Y-axis perpendicular to the X-axis; a driving unit including a ferromagnetic member, a coil acting a magnetic field on the ferromagnetic member and a voltage applying unit applying a voltage to the coil, either one of the ferromagnetic member and the coil being disposed at a position on the driving member apart from each of the X and Y axes in a an view of the movable plate; and a positioning portion that is disposed to the driving member and determine a fixing position of the ferromagnetic member and the coil with respect to the driving member. The movable plate rotates about each of the X and Y-axes by the voltage applying unit applying a voltage to the coil. The actuator allows the ferromagnetic member or the coil to be accurately fixed at a predetermined position on the driving member. As a result, the actuator can be provided that can demonstrate desired vibration characteristics.

It is preferable that the positioning portion be integrally formed with the driving member.

The positioning portion can thus be accurately formed at a predetermined position on the driving member. As a result, the ferromagnetic member and the coil can be fixed at the predetermined position on the driving member very accurately.

It is preferable that the driving member be formed from one of a Si layer of an SOI (silicon on insulator) substrate while the positioning portion be formed from at least a $SiO_2$ layer, the SOI substrate having the one Si layer, the other Si layer and the $SiO_2$ layer. As a result, the positioning portion and the driving member can be integrally formed very easily.

It is preferable that the driving member be provided with the ferromagnetic member that is a permanent magnet having a longitudinal shape and provided so that a line connected both pole of the magnet passes through an intersection of the X and Y-axes and slants with respect to each of the X and Y-axes. As a result, the movable plate can rotate about each of the X and Y-axes with a relatively simple structure.

It is preferable that both ends of the permanent magnet in a longitudinal direction thereof be fixed to the driving member and the positioning portion be provided as one pair so as to determine a fixing position of the both ends of the permanent magnet in the longitudinal direction. As a result, the permanent magnet can be accurately fixed at a predetermined position on the driving member.

It is preferable that the pair of positioning portions be formed so as to oppose each other across the permanent magnet in the longitudinal direction of the permanent magnet and so that a separation distance of the positioning portions is nearly equal to a length of the permanent magnet. As a result, the fixing position of the permanent magnet to the driving member can be prevented from being shifted in the longitudinal direction of the permanent magnet from a predetermined position.

It is preferable that each positioning portion include a pair of counter portions so as to oppose each other with the permanent magnet interposed therebetween in a width direction of the permanent magnet, and a separation distance between the pair of counter portions be nearly equal to a width length of the permanent magnet. As a result, the fixing position of the permanent magnet with respect to the driving member can be prevented from being shifted in the width direction of the permanent magnet from a predetermined position.

It is preferable that the driving member be provided with the ferromagnetic member that is a soft magnetic member, and the positioning portion be provided so as to surround an outer circumference of the soft magnetic member in a plan view of the movable plate. As a result, the soft magnetic member can be accurately fixed at a predetermined position on the driving member. In addition, the movable plate can rotate about each of the X and Y-axes with a relatively simple structure.

It is preferable that the soft magnetic member have a circular shape in the plan view of the movable plate. As a result, the soft magnetic member can be fixed at a fixing position determined by the positioning portion very easily and accurately in manufacturing the actuator.

It is preferable that the soft magnetic member be provided as one pair in two regions symmetrical with respect to the intersection of the X and Y axes, the two regions being included in four regions partitioned by the X and Y axes in the plan view of the movable plate, and the coil be provided as one pair so as to oppose each soft magnetic member. As a result, the movable plate can smoothly rotate about each of the X and Y-axes.

It is preferable that the pair of soft magnetic members be provided so as to be symmetrical with respect to the intersection of the X and Y axes in the plan view of the movable plate. As a result, the movable plate can more smoothly rotate about each of the X and Y-axes.

It is preferable that the voltage applying unit include a voltage generator generating a first voltage and a second voltage each of which varies periodically with a frequency different from each other, and a voltage adder adding the first voltage and the second voltage, and apply the added voltage to the coil to rotate the movable plate about the X-axis at a frequency of the first voltage and about the Y-axis at a frequency of the second voltage. This allows the movable plate to rotate about the X-axis at the frequency of the first voltage while rotating about the Y-axis at the frequency of the second voltage. That is, the actuator can easily demonstrate desired vibration characteristics by setting each of the first and second voltages as each predetermined value.

It is preferable that the frequency of the second voltage be equal to a resonance frequency of the second vibration system while the frequency of the first voltage be different from a resonance frequency of the first vibration system. This allows the movable plate to rotate about the X-axis at the frequency of the first voltage while rotating about the Y-axis at the frequency of the second voltage very smoothly and accurately.

It is preferable that the movable plate have a light reflector having light reflection property. The actuator can be used for MESM applied sensors such as acceleration sensors and angular velocity sensors, and optical devices such as optical scanners, optical switches, and optical attenuators.

According to a second aspect of the invention, an optical scanner includes: a first vibration system including a driving member having a frame shape, and a pair of first axial members each one end of which supports the driving member so as to allow the driving member to rotate about an X-axis; a second vibration system including a movable plate that is provided inside the driving member and has a light reflector having light reflection property, and a pair of second axial members each one end of which supports the movable plate so as to allow the movable plate to rotate about a Y-axis perpendicular to the X-axis; a driving unit including a ferromagnetic member, a coil acting a magnetic field on the ferromagnetic member and a voltage applying unit applying a voltage to the coil, either one of the ferromagnetic member and the coil being disposed at a position on the driving member apart from each of the X and Y axes in a plan view of the movable plate; and a positioning portion that is disposed to the driving member and determine a fixing position of the ferromagnetic member or the coil with respect to the driving member. The movable plate rotates about each of the X and Y-axes to two dimensionally scan light reflected off the light reflector by the voltage applying unit applying a voltage to the coil.

The scanner allows the ferromagnetic member and the coil to be accurately fixed at a predetermined position on the driving member. As a result, the optical scanner can be provided that can demonstrate desired scanning characteristics.

According to a third aspect of the invention, an image forming apparatus includes an optical scanner including: a first vibration system including a driving member having a frame shape, and a pair of first axial members each one end of which supports the driving member so as to allow the driving member to rotate about an X-axis; a second vibration system including a movable plate that is provided inside the driving member and has a light reflector having light reflection property, and a pair of second axial members each one end of which supports the movable plate so as to allow the movable plate to rotate about a Y-axis perpendicular to the X-axis; a driving unit including a ferromagnetic member, a coil acting a magnetic field on the ferromagnetic member and a voltage applying unit applying a voltage to the coil, either one of the ferromagnetic member and the coil being disposed at a position on the driving member apart from each of the X and Y axes in a plan view of the movable plate; and a positioning portion that is disposed to the driving member and determine a fixing position of the ferromagnetic member or the coil with respect to the driving member. The movable plate rotates about each of the X and Y-axes to two dimensionally scan light reflected off the light reflector by the voltage applying unit applying a voltage to the coil.

The scanner allows the ferromagnetic member and the coil to be accurately fixed at a predetermined position on the driving member. As a result, the image forming apparatus can be provided that includes the optical scanner capable of demonstrating desired scanning characteristics. In addition, the image forming apparatus can be downsized since light can be two dimensionally scanned by one optical scanner.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of an actuator, an optical scanner, and an image forming apparatus of the invention will be described with reference to accompanying drawings.

First Embodiment

An actuator according to a first embodiment of the invention will be described.

Figure 1:
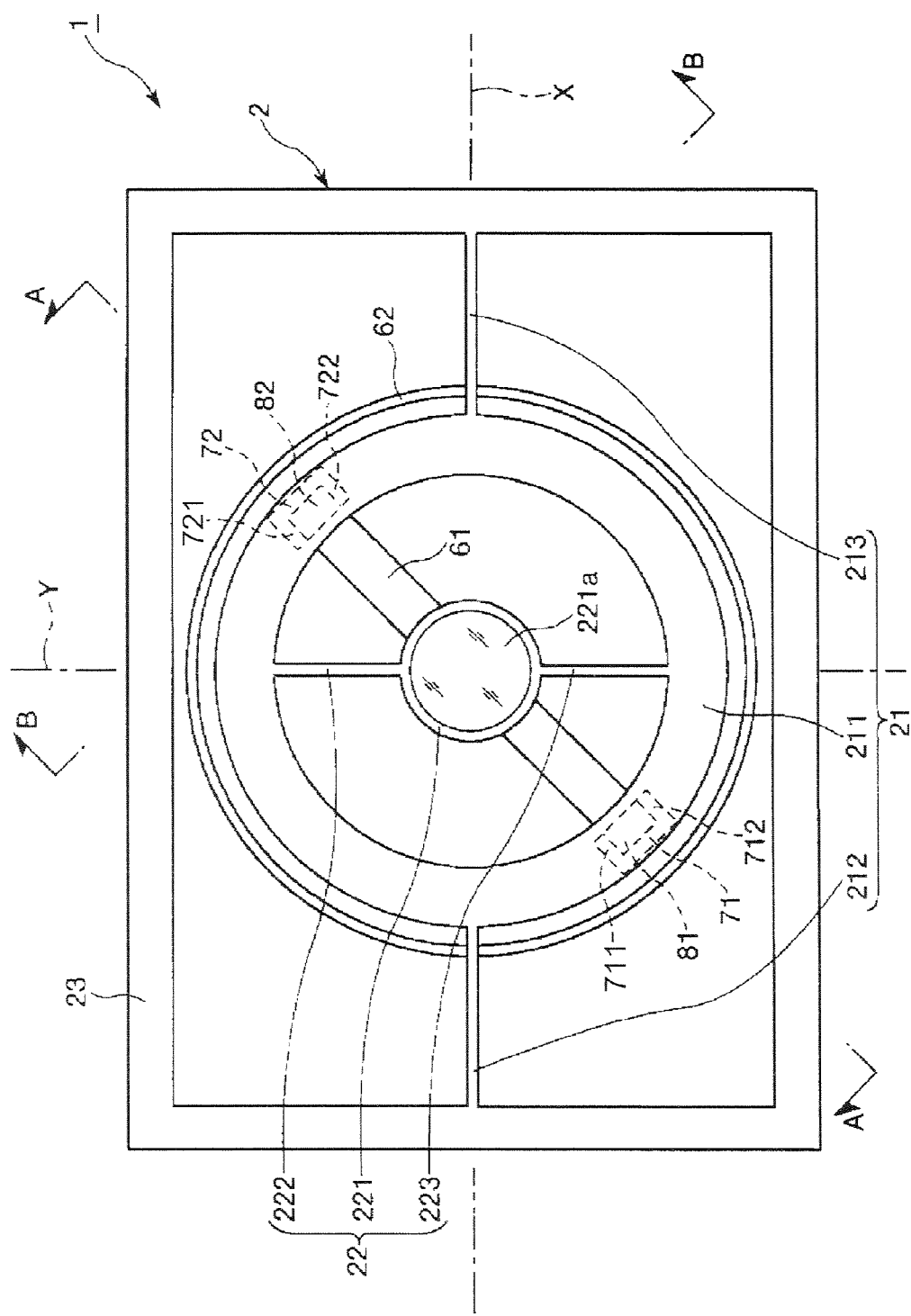
FIG. 1 is a plan view illustrating an actuator of a first embodiment of the invention.
Figure 2:
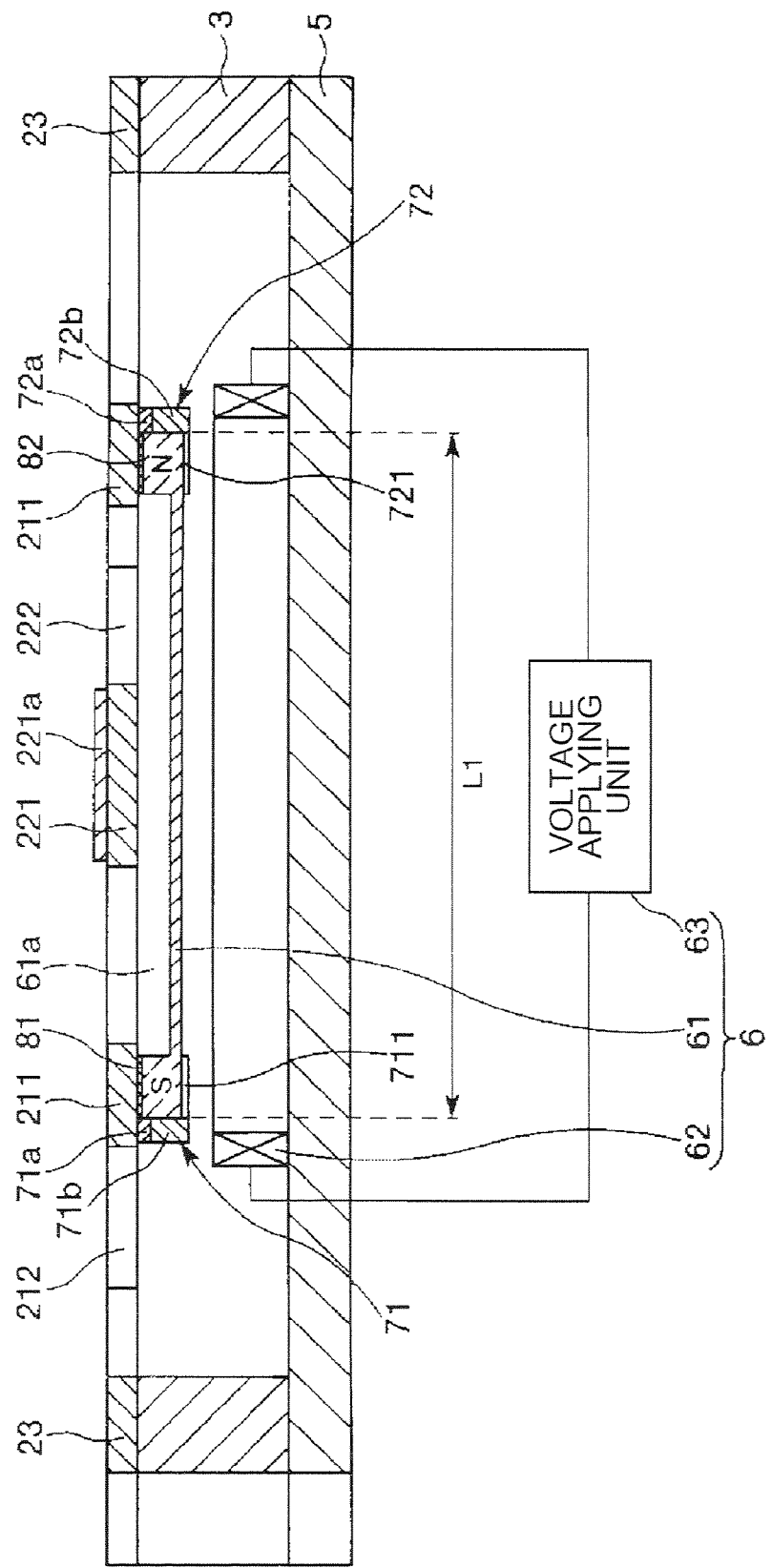
FIG. 2 is a sectional view taken along a line A-A of FIG. 1.
Figure 3:
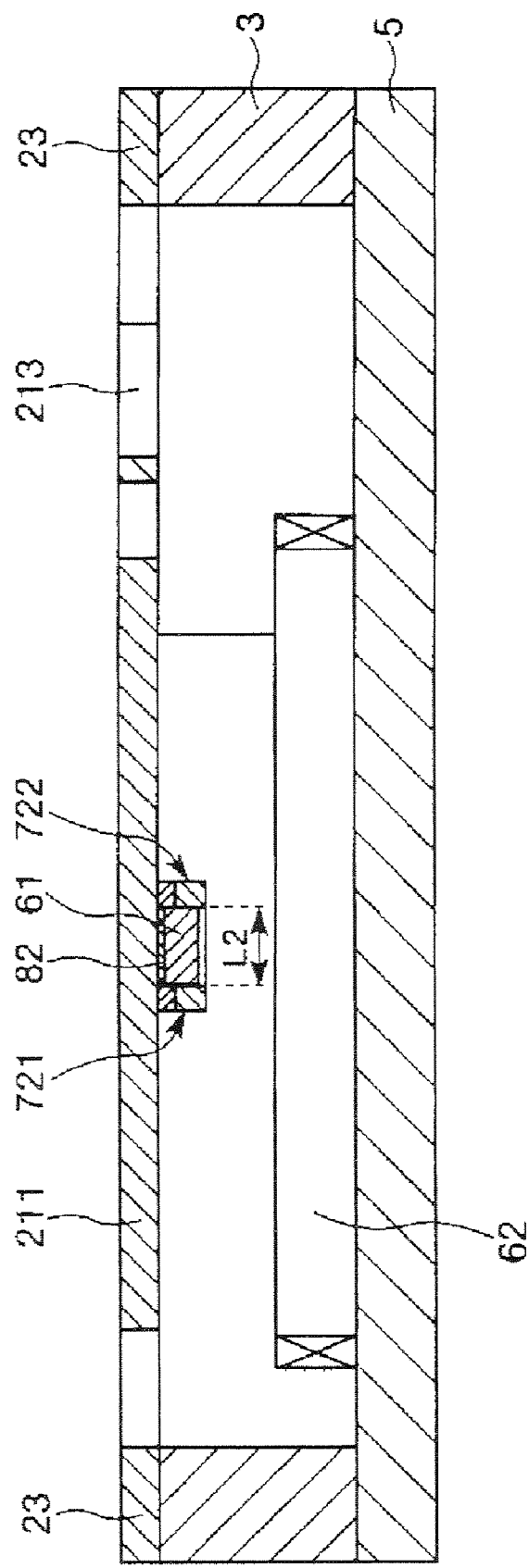
FIG. 3 is a sectional view taken along a line B-B of FIG. 1.
Figure 4:
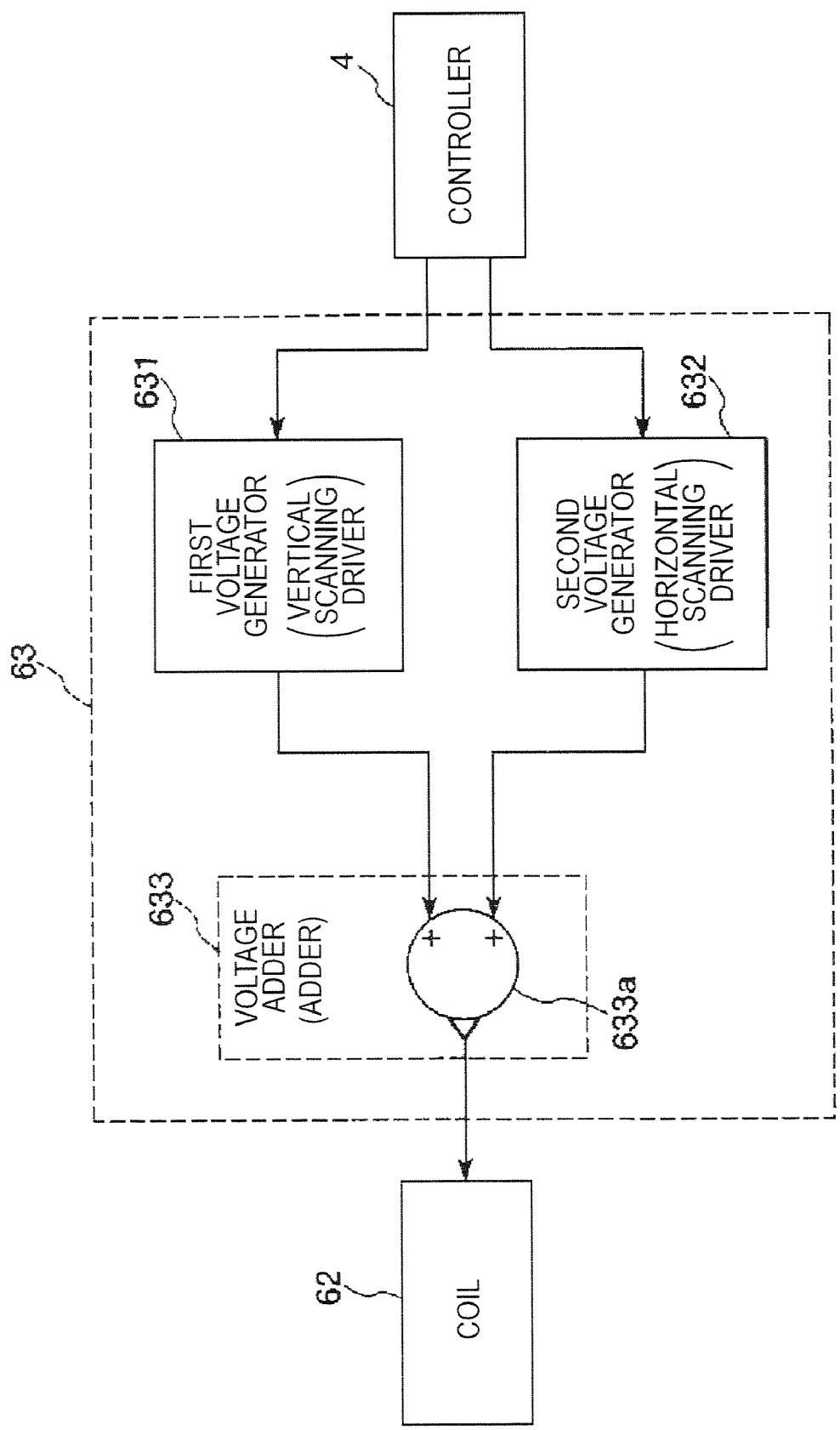
FIG. 4 is a block diagram illustrating a voltage applying unit of a driving unit included in the actuator shown in FIG. 1.
Figure 5A:
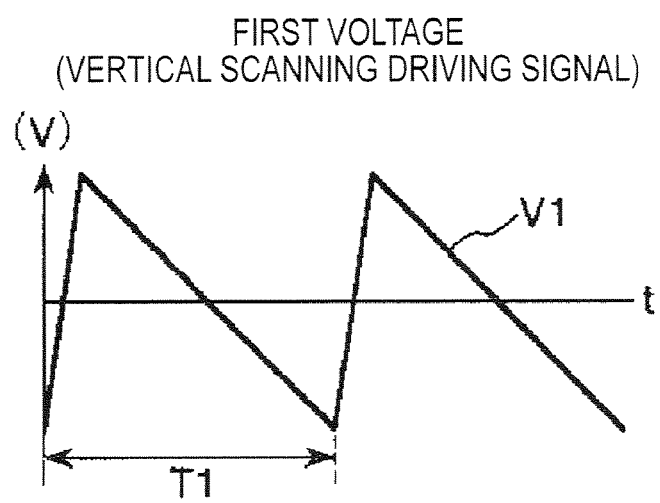
FIGS. 5A and 5B show an example of generated voltage in a first voltage generator and a second voltage generator shown in FIG. 4.
Figure 5B:
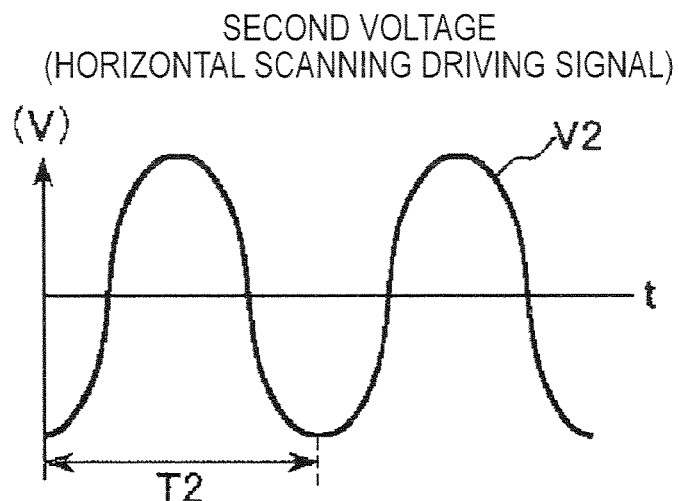

FIG. 1 is a top view of the actuator of the first embodiment of the invention. FIG. 2 is a sectional view taken along the line A-A of FIG. 1. FIG. 3 is a sectional view taken along the line B-B of FIG. 1. FIG. 4 is a block diagram illustrating a driving unit included in the actuator shown in FIG. 1. FIGS. 5A and 5B show an example of generated voltage in a first voltage generator and a second voltage generator shown in FIG. 4. For expository convenience, the front side, the rear side, the right side, and the left side in FIG. 1 are described as "up," "down or low," "right," and "left" respectively. Likewise, the top side, the bottom side, the right side, and the left side in FIG. 2 and FIG. 3 are described as "up," "down or low," "right," and "left" respectively.

As shown in FIGS. 1 and 2, an actuator 1 is provided with a base 2 including a first vibration system 21 and a second vibration system 22, a support substrate 3 supporting the base 2, a counter substrate 5 opposing the base 2 with the support substrate 3 interposed therebetween, a driving unit 6 composed of a permanent magnet 61, a coil 62, and a voltage-applying unit 63, and positioning portions 71 and 72 to determine the fixing position of the permanent magnet 61.

As shown in FIG. 1, the base 2 includes a support 23 having a frame shape, the first vibration system 21 supported by the support 23, and the second vibration system 22 supported by the first vibration system 21.

The first vibration system 21 is composed of a driving member 211 that is provided inside the support 23 and has a frame shape, and a pair of first axial members 212 and 213, each one end of which is connected to the support 23 so as to support the driving member 211. Likewise, the second vibration system 22 is composed of a movable plate 221 provided inside the driving member 211, and a pair of second axial members 222 and 223, each one end of which is connected to the driving member 211 so as to support the movable plate 221.

The driving member 211 has a ring shape in plan view of FIG. 1 (i.e., in plan view of the movable plate 221). The shape of the driving member 211 is not particularly limited as long as it has a frame shape. For example, it may be a squared ring shape in plan view of FIG. 1. The permanent magnet 61 having an elongated shape is fixed (tightly bonded) on the lower surface of the driving member 211. The permanent magnet 61 is accurately fixed at a fixing position determined by the pair of positioning portions 71 and 72 that are formed on the lower surface of the driving member 211. The driving member 211 is supported by the pair of first axial members 212 and 213 at each end thereof connected to the support 23.

Each of the first axial members 212 and 213 has an elongated shape and is capable of being elastically deformed. Each of the first axial members 212 and 213 links the driving member 211 and the support 23 so as to allow the driving member 211 to rotate relative to the support 23. The first axial members 212 and 213 are coaxially provided. The axis is referred to as a "rotation center axis X" hereinafter. The driving member 211 rotates relative to the support 23 around the axis.

The movable plate 221, formed inside the driving member 211, has a ring shape in plan view of FIG. 1. The shape of the movable plate 221 is not particularly limited as long as it is formed inside the driving member 211. For example, it may be an elliptical shape or a squared ring shape in plan view of FIG. 1. A light reflector 221*a* having light reflection property is disposed on the upper surface of the movable plate 221. The movable plate 221 is supported by the pair of second axial members 222 and 223 at each end thereof connected to the driving member 211.

Each of the second axial members 222 and 223 has an elongated shape and is capable of being elastically deformed. Each of the second axial members 222 and 223 links the movable plate 221 and the driving member 211 so as to allow the movable plate 211 to rotate relative to the driving member 211. The second axial members 222 and 223 are coaxially provided. The axis is referred to as a "rotation center axis Y" hereinafter. The movable plate 221 rotates relative to the driving member 211 around the axis.

As shown in FIG. 1, the rotation center axes X and Y are perpendicular to each other. That is, the rotation center axes X and Y make an angle of 90 degrees. In addition, each center of the driving member 211 and the movable plate 221 is located on the intersection of the rotation center axes X and Y in plan view of FIG. 1. In the following descriptions, for expository convenience, the intersection of the rotation center axes X and Y is also referred to as an "intersection G."

The base 2 is, for example, mainly made of silicon. In this case, the movable plate 221, the second axial members 222 and 223, the driving member 211, the first axial members 212 and 213, and the support 23 are integrally formed. The use of silicon as a main material can achieve superior durability as well as superior rotation characteristics. The material also enables the base to be finely processed. Thus, the actuator 1 can be downsized.

The base 2 may include the movable plate 221, the second axial members 222 and 223, the driving member 211, the first axial members 212 and 213, and the support 23 all of which are formed from a substrate having a multilayered structure, such as SOI substrates. In this case, the movable plate 221, the second axial members 222 and 223, the driving member 211, the first axial members 212 and 213, and the support 23 are preferably integrally formed from one layer of the multilayered substrate.

As shown in FIG. 2, the base 2 is bonded to the support substrate 3. The support substrate 3 is, for example, mainly made of glass or silicon. The support substrate 3 has nearly the same shape as of the support 23 in plan view of the movable plate 221 (i.e., a frame shape). The shape of the support substrate 3, however, is not particularly limited as long as it can support the base 2. In addition, a particular shape of the support 23 may omit the support substrate 3.

As shown in FIG. 2, the counter substrate 5 is provided so as to oppose the base 2 with the support substrate 3 interposed therebetween. The support substrate 5 is, for example, mainly made of glass or silicon. The upper surface of the counter substrate 5 has the coil 62 generating a magnetic field for acting the permanent magnet 61. The coil 62 is electrically coupled to the voltage applying unit 63. The permanent magnet 61, the coil 62, and the voltage applying unit 63 are included in the driving unit 6.

As described above, the pair of positioning portions 71 and 72 is formed on the lower surface of the driving member 211. The positioning portions 71 and 72 determine the fixing position of the permanent magnet 61 with respect to the driving member 211, thereby allowing the permanent magnet 61 to be accurately fixed on a predetermined position on the driving member 211. As a result, the actuator 1 can demonstrate desired vibration characteristics. In addition, individual differences in vibration characteristics of actuators are suppressed, for example, in mass producing the actuator 1. As a result, the yield rate can be improved.

Further, the positioning portions 71 and 72 formed on the lower surface of the driving member 211 allow the permanent magnet 61 to be fixed to the under surface of the driving member 211. This structure can shorten the separation distance between the permanent magnet 61 and the coil 62. As a result, the actuator 1 can be downsized and lower powered.

As shown in FIGS. 1 and 2, the pair of positioning portions 71 and 72 is formed so as to oppose each other in the longitudinal direction of the permanent magnet 61. The permanent magnet 61 is disposed between the pair of positioning portions 71 and 72.

The separation distance ($L_1$ in FIG. 2) between the pair of positioning portions 71 and 72 is nearly equal to the longitudinal length of the permanent magnet 61. The pair of positioning portions 71 and 72 formed in such manner can reliably prevent the fixing position of the permanent magnet 61 with respect to the driving member 211 from being shifted in the longitudinal direction of the permanent magnet 61 (i.e., radius direction of the driving member 211) from a predetermined position.

The positioning portion 71 is formed so as to engage with one end, in the longitudinal direction, of the permanent magnet 61. The positioning portion 71 is provided with a pair of counter portions 711 and 712 disposed so as to oppose each other in the width direction of the permanent magnet 61. The one end of the permanent magnet 61 is disposed between the pair of counter portions 711 and 712.

The separation distance between the pair of counter portions 711 and 712 is nearly equal to the width of the permanent magnet 61. This structure can reliably prevent the fixing position of the permanent magnet 61 with respect to the driving member 211 from being shifted in the width direction of the permanent magnet 61 (i.e., circumferential direction of the driving member 211) from a predetermined position.

The positioning portion 71 has a reversed rectangular C shape in plan view of FIG. 1. The shape of the positioning portion 71, however, is not particularly limited as long as it can determine the fixing position of the permanent magnet 61 with respect to the driving member 211. For example, the counter portions 711 and 712 may be individually formed as separate portions.

Likewise, the positioning portion 72 is formed so as to engage with the other end, in the longitudinal direction, of the permanent magnet 61. The positioning portion 72 is provided with a pair of counter portions 721 and 722 disposed so as to oppose each other in the width direction of the permanent magnet 61. The other end of the permanent magnet 61 is disposed between the pair of counter portions 721 and 722.

The separation distance ($L_2$ in FIG. 3) between the pair of counter portions 721 and 722 is nearly equal to the width of the permanent magnet 61. This structure can reliably prevent the fixing position of the permanent magnet 61 with respect to the driving member 211 from being shifted in the width direction of the permanent magnet 61 from a predetermined position.

The positioning portion 72 has a reversed rectangular C shape in plan view of FIG. 1. The shape of the positioning portion 72, however, is not particularly limited as long as it can determine the fixing position of the permanent magnet 61 with respect to the driving member 211. For example, the counter portions 721 and 722 may be individually formed as separate portions.

Material used for the positioning portions 71 and 72 are not particularly limited as long as it can be formed on the driving member 211 and determine the fixing position of the permanent magnet 61 with respect to the driving member 211. Examples of the material includes: glass; silicon; ceramics; metallic materials, such as, Li, Be, B, Na, Mg, Al, K, Ca, Sc, V, Cr, Mn, Fe, Co, Ni, Cu, Zn, Ga, Rb, Sr, Y, Zr, Nb, Mo, Cd, In, Sn, Sb, Cs, Ba, La, Hf, Ta, W, Tl, Pb, Bi, Ce, Pr, Nd, Pm, Sm, Eu, Gd, Tb, Dy, Ho, Er, Tm, Yb, Lu, Ag, Au, Pt, and Pd; thermosetting resins; and thermoplastic resins.

In the embodiment, the positioning portion 71 is composed of a first layer 71a and a second layer 71b that are layered in the thickness direction of the movable plate 221 (i.e., in a direction perpendicular to both the rotation center axes X and Y) as shown in FIG. 2. The first layer 71a is mainly made of $SiO_2$ while the second layer 71b is mainly made of silicon. Likewise, the positioning portion 72 is composed of a first layer 72a mainly made of $SiO_2$ and a second layer 72b mainly made of silicon both of which are layered in the thickness direction of the movable plate 221.

Employing the positioning portions 71 and 72 structured in such manner, the positioning portions 71 and 72, and the driving member 211 can be integrally formed very easily by using an SOI substrate. Specifically, for example, the base 2 (the driving member 211) is formed from one Si layer of the SOI substrate, the first layer 71a of the positioning portion 71 and the first layer 72a of the positioning portion 72 are formed from the $SiO_2$ layer, and the second layer 71b of the positioning portion 71 and the second layer 72b of the positioning portion 72 are formed from the other Si layer. As a result, the positioning portions 71 and 72, and the driving member 211 can be integrally formed. The forming method is not limited to this as long as the positioning portions 71 and 72, and the driving member 211 can be integrally formed. For example, the positioning portions 71 and 72 may be formed only from the $SiO_2$ layer of the SOI substrate. The positioning portions 71 and 72, and the driving member 211 may be integrally formed from a substrate, other than the SOI substrate, having a layered structure. The positioning portions 71 and 72, and the driving member 211 may also be integrally formed from a single-layer substrate, such as a silicon substrate.

By integrally forming the positioning portions 71 and 72, and the driving member 211 in such manner, the positioning portions 71 and 72 can be precisely (very accurately) formed at a predetermined position on the driving member 211. As a result, the fixing position of the permanent magnet 61 with respect to the driving member 211 can be determined very accurately.

The permanent magnet 61 is fixed at the fixing position determined by the positioning portions 71 and 72. The permanent magnet 61 is provided to a side adjacent to a surface, opposing the surface on which the light reflector 221a is disposed, of the movable plate 221, as shown in FIG. 2. This structure can prevent a light scanning on the light reflector 221a from being hindered by the permanent magnet 61.

The permanent magnet 61 is also provided along a line (hereinafter, referred to as a "line J") that goes through the intersection (hereinafter, referred to an "intersection G") of the rotation center axes X and Y, and is slanted with respect to each of the rotation center axes X and Y, in plan view of FIG. 1.

The permanent magnet 61 has an S pole at one end part while a north pole at the other part, in the longitudinal direction with respect to the intersection G. The permanent magnet 61 is illustrated so as to have the S pole at the left side while the N pole at the right side in its longitudinal direction in FIG. 2 for expository convenience. The position of the S and N poles may be reversed.

In plan view of FIG. 1, a slanting angle $\theta$ of the line J with respect to the rotation center axis X is preferably from 30 to 60 degrees, more preferably from 40 to 50 degrees, and further preferably about 45 degrees. Providing the permanent magnet 61 in such manner allows the movable plate 221 to rotate about each of the rotation center axes X and Y very smoothly. In contrast, in a case where the slanting angle $\theta$ is less than the above-described lower limit value, the movable plate 221 may often not rotate about the X-axis smoothly depending on the intensity of voltage applied to the coil 62. In a case where the slanting angle $\theta$ is more than the above-described upper limit value, the movable plate 221 may also often not rotate about the Y-axis smoothly depending on the intensity of voltage applied to the coil 62.

In the embodiment, the line J is slanted by 45 degrees with respect to each of the rotation center axes X and Y.

The permanent magnet 61 has a recess 61*a* on its surface facing the movable plate 221 (i.e., the upper surface), as shown in FIG. 2. The recess 61*a* is an escaping portion to avoid making contact between the permanent magnet 61 and the movable plate 221. The recess (escaping portion) 61*a* allows the movable plate 221 to smoothly rotate about the rotation center axis Y. The recess 61*a* provided so as to serve as an escaping portion also can very easily avoid making contact between the permanent magnet 61 and the movable plate 221. The escaping portion is not particularly limited as long as it can avoid making contact between the permanent magnet 61 and the movable plate 221. For example, a through hole may be employed that is formed in a direction perpendicular to each of the rotation center axes X and Y. In addition, adhesive layers 81 and 82 having a thickness that can avoid making contact between the permanent magnet 61 and the movable plate 221 may omit the recess 61*a*.

The kind of magnet for the permanent magnet 61 is not particularly limited. For example, a magnet, such as neodymium, ferrite, samarium-cobalt, alnico, and bond magnets, can be preferably used that is obtained by magnetizing a hard magnetic material.

A magnetized hard magnetic material (i.e., permanent magnet) may be provided to the under surface of the driving member 211 as the permanent magnet 61 while a hard magnetic material may be provided to the driving member 211 so as to be magnetized and serve as the permanent magnet 61.

The permanent magnet 61 is bonded to the driving member 211 with the adhesive layers 81 and 82 interposed therebetween, as shown in FIG. 2. The adhesive layers 81 and 82 are made of an adhesive. As a result, the driving member 211 and the permanent magnet 61 can be adhesively bonded simply and firmly. A material mainly included in such adhesive is not particularly limited as long as it can adhesively bond the driving member 211 and the permanent magnet 61. Thermosetting resins are preferably employed as a material included in the adhesive. As a result, the driving member 211 and the permanent magnet 61 can be adhesively bonded more firmly.

Here, each of the adhesive layers 81 and 82 has a characteristic of being shrunk as the adhesive hardens. However, the actuator 1 can effectively avoid the displacement of the permanent magnet 61 due to the shrinkage of the adhesive layers 81 and 82, since it is provided with the positioning portions 71 and 72. From above points of view, the actuator 1 can be provided that can demonstrate desired vibration characteristics while simplifying manufacturing processes and achieving low costs by forming the positioning portions 71 and 72, and bonding the permanent magnet 61 to the driving member 211 with the adhesive layers 81 and 82 interposed there between.

The method for bonding the permanent magnet 61 and the driving member 211 is not particularly limited as long as the permanent magnet 61 can be fixed at a predetermined position determined by the positioning portions 71 and 72.

The coil 62 is provided directly under the permanent magnet 61. This structure allows a magnetic field generated from the coil 62 to efficiently act on the permanent magnet 61. As a result, the actuator 1 can be downsized and lower powered.

The coil 62 is formed so as to surround the outer circumference of the driving member 211 in plan view of FIG. 1, as shown in FIG. 1. This structure can reliably avoid making contact between the driving member 211 and the coil 62 in driving the actuator 1. This structure also can enormously shorten the separation distance between the coil 62 and the permanent magnet 61. As a result, a magnetic field generated from the coil 62 can efficiently act on the permanent magnet 61. That is, the actuator 1 can be downsized and lower powered more efficiently. The coil 62 may be wound around a core, for example.

The coil 62 is electrically coupled to the voltage applying unit 63. The voltage applying unit 63 applies a voltage to the coil 62, which generates a magnetic field having magnetic fluxes along an axis perpendicular to each of the rotation center axes X and Y.

As shown in FIG. 4, the voltage applying unit 631 is provided with a first voltage generator 631, a second voltage generator 632, and a voltage adder 633. The first voltage generator 631 generates a first voltage V1 for rotating the movable plate 221 about the rotation center axis X while the second voltage generator 632 generates a second voltage V2 for rotating the movable plate 221 about the rotation center axis Y. The voltage adder 633 adds the first voltage V1 and the second voltage V2 so as to apply the resulting voltage to the coil 62.

The first voltage generator 631 generates the first voltage V1 (vertical scanning voltage) periodically varying with a period T1, as shown in FIG. 5A.

The first voltage V1 has a saw-tooth wave. This waveform allows the actuator 1 to effectively perform a vertical scanning (sub-scanning) of light. The waveform of the first voltage V1 is not limited to this. The frequency (1/T1) of the first voltage V1 is not particularly limited as long as it is favorable for the vertical scanning. It is preferable from 30 Hz to 80 Hz (about 60 Hz).

In the embodiment, the frequency of the first voltage V1 is adjusted so as to differ from the torsional resonance frequency of the first vibration system 21 composed of the driving member 211, and the pair of first axial members 212 and 213.

On the other hand, the second voltage generator 632 generates the second voltage V2 (horizontal scanning voltage) periodically varying with a period T2 different from the period T1, as shown in FIG. 5B.

The second voltage V2 has a waveform like a sine wave. This waveform allows the actuator 1 to effectively perform a main scanning of light. The waveform of the second voltage V2 is not limited to this.

It is preferable that the frequency of the second voltage V2 is higher than that of the first voltage V1. That is, it is preferable that the period T2 is shorter than the period T1. As a result, the movable plate 221 can rotate about the rotation center axis X with the frequency of the first voltage V1 while rotating about the rotation center axis Y with the frequency of the second voltage V2 more reliably and smoothly.

The frequency of the second voltage V2 is not particularly limited as long as it is different from the frequency of the first voltage V1 and favorable for the horizontal scanning. It is preferable from 10 kHz to 40 kHz. With the condition in which the frequency of the second voltage V2 is from 10 kHz to 40 kHz, and the frequency of the first voltage V1 is about 60 Hz, the movable plate 221 can rotate about each of the rotation center axes X and Y at a frequency suitable for display drawing. The combination of the frequencies of the first voltage V1 and the second voltage V2 is not particularly limited as long as the movable plate 221 can rotate about each of the rotation center axes X and Y.

In the embodiment, the frequency of the second voltage V2 is adjusted so as to be equal to the torsional resonance frequency of the second vibration system 22 composed of the movable plate 221, and the pair of second axial members 222 and 223. That is, the second vibration system 22 is designed (manufactured) so that its torsional resonance frequency is favorable for the horizontal scanning. As a result, the movable plate 221 can rotate about the rotation center axis Y with a large rotation angle.

It is preferable that $f_2 > f_1$, and more preferable $f_2 \geq 10 f_1$, where $f_1$ (Hz) is the resonance frequency of the first vibration system 21, and $f_2$ (Hz) is the resonance frequency of the second vibration system 22. As a result, the movable plate 221 can rotate about the rotation center axis X with the frequency of the first voltage V1 while rotating about the rotation center axis Y with the frequency of the second voltage V2 more smoothly.

The first voltage generator 631 and the second voltage generator 632 are coupled to a controller 4, which drives them with a signal. The first voltage generator 631 and the second voltage generator 632 are coupled to the voltage adder 933.

The voltage adder 633 includes an adder 633a for applying voltage to the coil 62. The adder 633a receives the first voltage V1 from the first voltage generator 631 and the second voltage V2 from the second voltage generator 632, and then adds the voltages so as to apply the added voltage to the coil 62.

The actuator 1 structured described as above is driven as follows. In the embodiment, as described above, the frequency of the first voltage V1 is set as a value different from the torsional frequency of the first vibration system 21 while the frequency of the second voltage V2 is set equal to the torsional frequency of the second vibration system 22 and set as a value larger than the frequency of the first voltage V1. For example, the frequency of the first voltage V1 is 60 Hz and the frequency of the second voltage V2 is 15 kHz.

The first voltage V1 shown in FIG. 5A and the second voltage V2 shown in FIG. 5B are added by the voltage adder 633, for example. The added voltage (referred to as a "voltage V3") is applied to the coil 62.

A voltage corresponding to the first voltage V1 of the voltage V3 alternately switches two magnetic fields. One magnetic field (referred to as a "magnetic field A1") tends to attract the vicinity of the adhesive layer 81 of the driving member 211 to the coil 62 while tending to repel the vicinity of the adhesive layer 82 of the driving member 211 from the coil 62. The other magnetic field (referred to as a "magnetic field A2") tends to repel the vicinity of the adhesive layer 81 of the driving member 211 from the coil 62 while tending to attract the vicinity of the adhesive layer 82 of the driving member 211.

In plan view of FIG. 1, the adhesive layer 81 is located at one side while the adhesive layer 82 is located at the other side, with respect to the rotation center axis X of the driving member 211. In other words, the pair of first adhesive layers 81 and 82 is disposed to the driving member 211 so as to across the rotation center axis X and face each other in plan view of FIG. 1. Because of this arrangement, the driving member 211 rotates together with the movable plate 221 about the rotation center axis X at the frequency of the first voltage V1 while twisting the first axial members 212 and 213 when the magnetic fields A1 and A2 are alternately switched.

The frequency of the first voltage V1 is set as enormously lower than the frequency of the second voltage V2. The resonance frequency of the first vibration system 21 is designed so as to be lower than the resonance frequency of the second vibration system 22 (for example, $\frac{1}{10}$ or less of the resonance frequency of the second vibration system 22). That is, the first vibration system 21 rotates about the rotation center axis X by the first voltage V1, since it is designed that the first vibration system 21 more easily vibrates than the second vibration system 22. That is, this design can prevent the driving member 211 from being rotated about the rotation center axis X by the second voltage V2.

On the other hand, a voltage corresponding to the second voltage V2 of the voltage V3 alternately switches two magnetic fields. One magnetic field (referred to as a "magnetic field B1") tends to attract the vicinity of the adhesive layer 81 of the driving member 211 to the coil 62 while tending to repel the vicinity of the adhesive layer 82 of the driving member 211 from the coil 62. The other magnetic field (referred to as a "magnetic field B2") tends to repel the vicinity of the adhesive layer 81 of the driving member 211 from the coil 62 while tending to attract the vicinity of the adhesive layer 82 of the driving member 211.

In plan view of FIG. 1, the adhesive layer 81 is located at one side while the adhesive layer 82 is located at the other side, with respect to the rotation center axis Y of the driving member 211. In other words, the pair of first adhesive layers 81 and 82 is disposed to the driving member 211 so as to across the rotation center axis Y and face each other in plan view of FIG. 1. Because of this arrangement, the movable plate 221 rotates about the rotation center axis Y at the frequency of the second voltage V2 while twisting the second axial members 222 and 223 when the magnetic fields B1 and B2 are alternately switched.

The frequency of the second voltage V2 is equal to the torsional resonance frequency of the second vibration system 22. That makes it possible to dominantly rotate the movable plate 221 about the rotation center axis Y by the second voltage V2. That is, the movable plate 221 can be prevented from being rotated about the rotation center axis Y by the first voltage V1.

As described above, in the actuator 1, the movable plate 221 can rotate about the rotation center axis X at the frequency of the first voltage V1 while rotating about the rotation center axis Y at the frequency of the second voltage V2 by applying the voltage V3, which is obtained by adding the first voltage V1 and the second voltage V2, to the coil 62. As a result, the movable plate 221 can rotate about each of the rotation center axes X and Y while achieving low costs and downsizing.

Particularly, the number of permanent magnets and coils that are included in a driving source can be lessened, achieving a simple and compact structure.

The actuator 1 has the movable plate 221 rotating about each of the rotation center axes X and Y as described above. Because of this structure, the rotational characteristics of the movable plate 221 about each of the rotation center axes X and Y could be shifted from desired characteristics if the fixing position of the permanent magnet 61 with respect to the driving member 211 shifts from a predetermined position since the positioning portions 71 and 72 are not formed. To avoid such occurrence, the actuator 1 is provided with the positioning portions 71 and 72. As a result, the desired vibration characteristics can be demonstrated very simply and reliably.

In addition, the thermal expansion of the base 2 due to heat produced from the coil 62 by an energization can be suppressed by providing the permanent magnet 61 to the driving member 211 and the coil 62 to the permanent magnet 61 so as to face each other. As a result, the actuator 1 can demonstrate desired vibration characteristics for a prolonged period of time.

The actuator 1 described above can be manufactured as follows, for example.

FIGS. 6A to 6G are views for explaining a method for manufacturing the actuator 1 (corresponding to a sectional view taken along the line B-B of FIG. 1). For expository convenience, the top side in FIGS. 6A to 6G is described as "up," while the bottom side is described as "down or low."

Figure 6A:
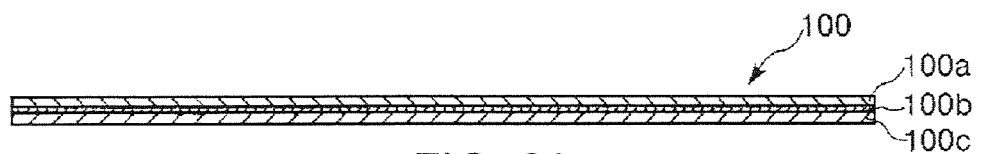
FIGS. 6A to 6G show a method for manufacturing the actuator shown in FIG. 1.
Figure 6B:
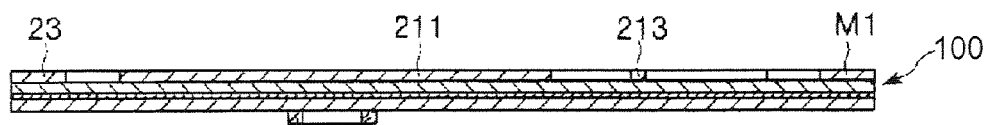

As shown in FIG. 6A, an SOI substrate 100 is prepared for forming the base 2 and the positioning portions 71 and 72. The SOI substrate 100 has a layered structure composed of a Si layer 100a, a $SiO_2$ layer 100b, and a Si layer 100c. Then, as shown in FIG. 6B, a resist mask M1 is formed on the upper surface of the Si layer 100a while a resist mask M2 is formed on the lower surface of the Si layer 100c. The resist mask M1 has a shape corresponding to the shapes in plan view of the movable plate 221, the second axial members 222 and 223, the driving member 211, the first axial members 212 and 213, and the support 23. The resist mask M2 has a shape corresponding to the shapes in plan view of the positioning portions 71 and 72.

Figure 6C:
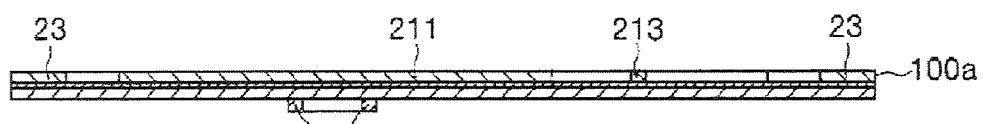

Next, the Si layer 100a is etched with the resist mask M1. The resist mask M1 is then removed. As a result, as shown in FIG. 6C, the Si layer 110a is achieved in which the movable plate 221, the second axial members 222 and 223, the driving member 211, the first axial member 213, and the support 23 are integrally formed. In this step, the $SiO_2$ layer 100b functions as an etching stop layer. As for the etching method, one or more than one in combination of the following exemplary methods can be used: physical etching, such as plasma etching, reactive ion etching, beam etching, and photo assist etching; and chemical etching, such as wet etching. The same method can be used in etching of the following each step.

Figure 6D:
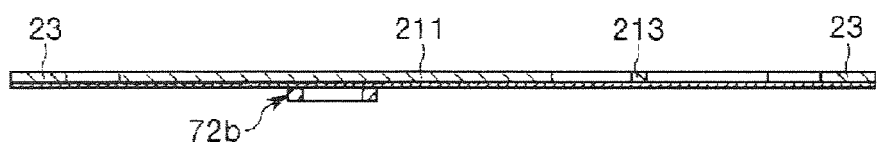

Next, the Si layer 100c is etched with the resist mask M2. The resist mask M2 is then removed. As a result, as shown in FIG. 6D, the Si layer 100c is achieved in which the second layer 71b of the positioning portion 71 and the second layer 72b of the positioning portion 72 are formed. In this step, the $SiO_2$ layer 100b functions as an etching stop layer.

Figure 6E:
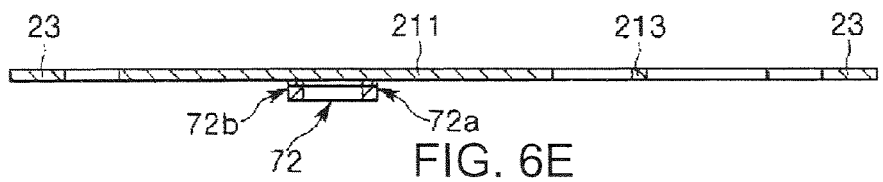

Then, the $SiO_2$ layer 100b is removed excluding a part corresponding to the plan view shape of the positioning portions 71 and 72. As a result, as shown in FIG. 6E, the $SiO_2$ layer 100b is achieved in which the first layer 71a of the positioning portion 71 and the first layer 72a of the positioning portion 72 are formed. That is, the positioning portions 71 and 72 are achieved that are integrally formed with the driving member 211. As described above, the positioning portions 71 and 72 can be integrally formed with the driving member 211 very simply by using the SOI substrate.

Next, a metal film is formed on the upper surface of the movable plate 221 to form the light reflector 221a (not shown). Examples of methods for forming such metal film include: a dry plating method, such as vapor deposition, sputtering (low temperature sputtering), and ion plating; a wet plating method, such as electrolytic plating and electroless plating; metallic spraying; and metallic foil bonding.

Figure 6F:
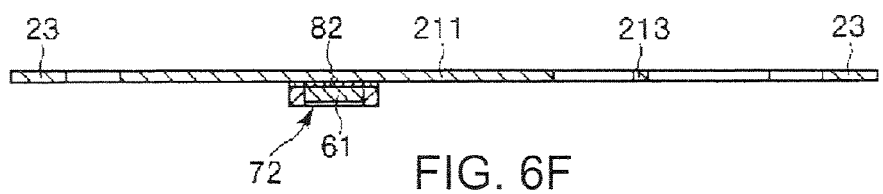

Next, as shown in FIG. 6F, a hard magnetic material having the recess 61a is fixed at a fixing position determined by the positioning portions 71 and 72 on the driving member 211 with the adhesive layers 81 and 82. The hard magnetic material fixed on the driving member 211 is magnetized to become the permanent magnet 61.

On the other hand, the support substrate 3 and the counter substrate 5 are individually formed by etching a silicon substrate (not shown). The method for manufacturing the support substrate 3 and the counter substrate 5 is the same as the method for forming the base 2 and the like from the SOI substrate 100 described above. Thus, the explanation is omitted. Here, the coil 62 is bonded to the upper surface of the counter substrate 5.

Figure 6G:
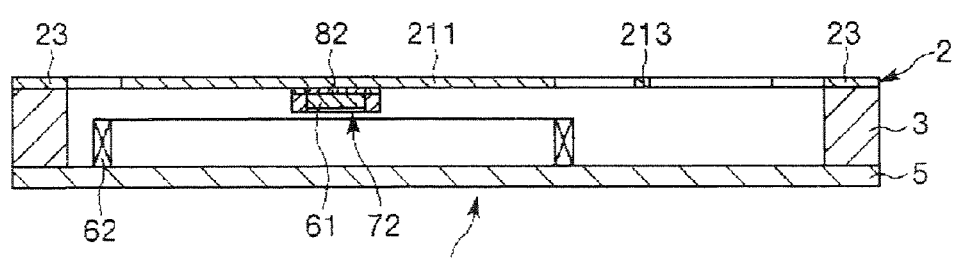

Finally, the SOI substrate 100 in which the base 2 and the positioning portions 71 and 72 are integrally formed, the support substrate 3, and the counter substrate 5 are bonded to achieve the actuator 1, as shown in FIG. 6G. The bonding method is not particularly limited. For example, bonding with an adhesive or an anodic bonding may be employed.

Second Embodiment

Next, an actuator according to a second embodiment of the invention will be described.

Figure 7:
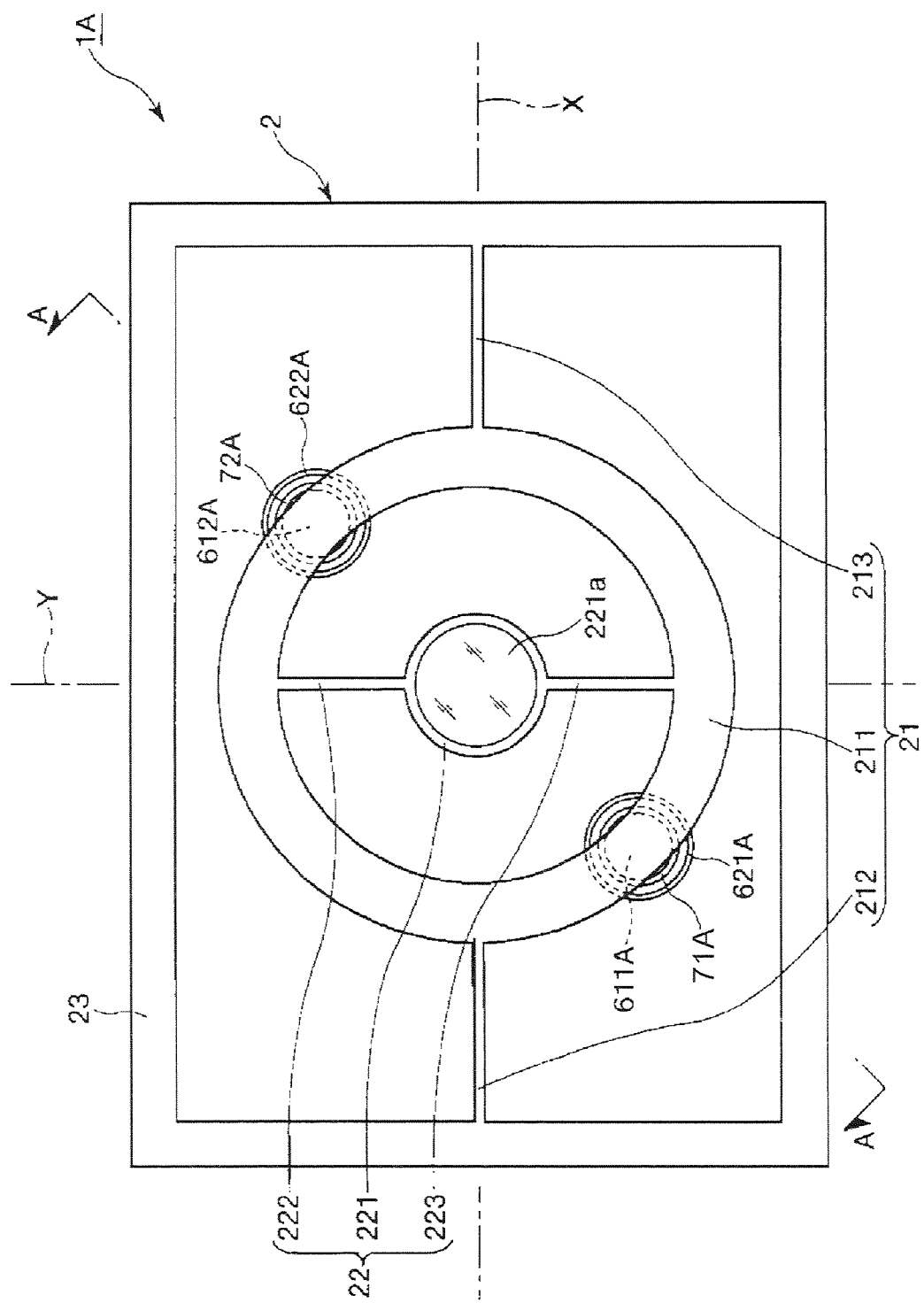
FIG. 7 is a plan view illustrating an actuator of a second embodiment of the invention.
Figure 8:
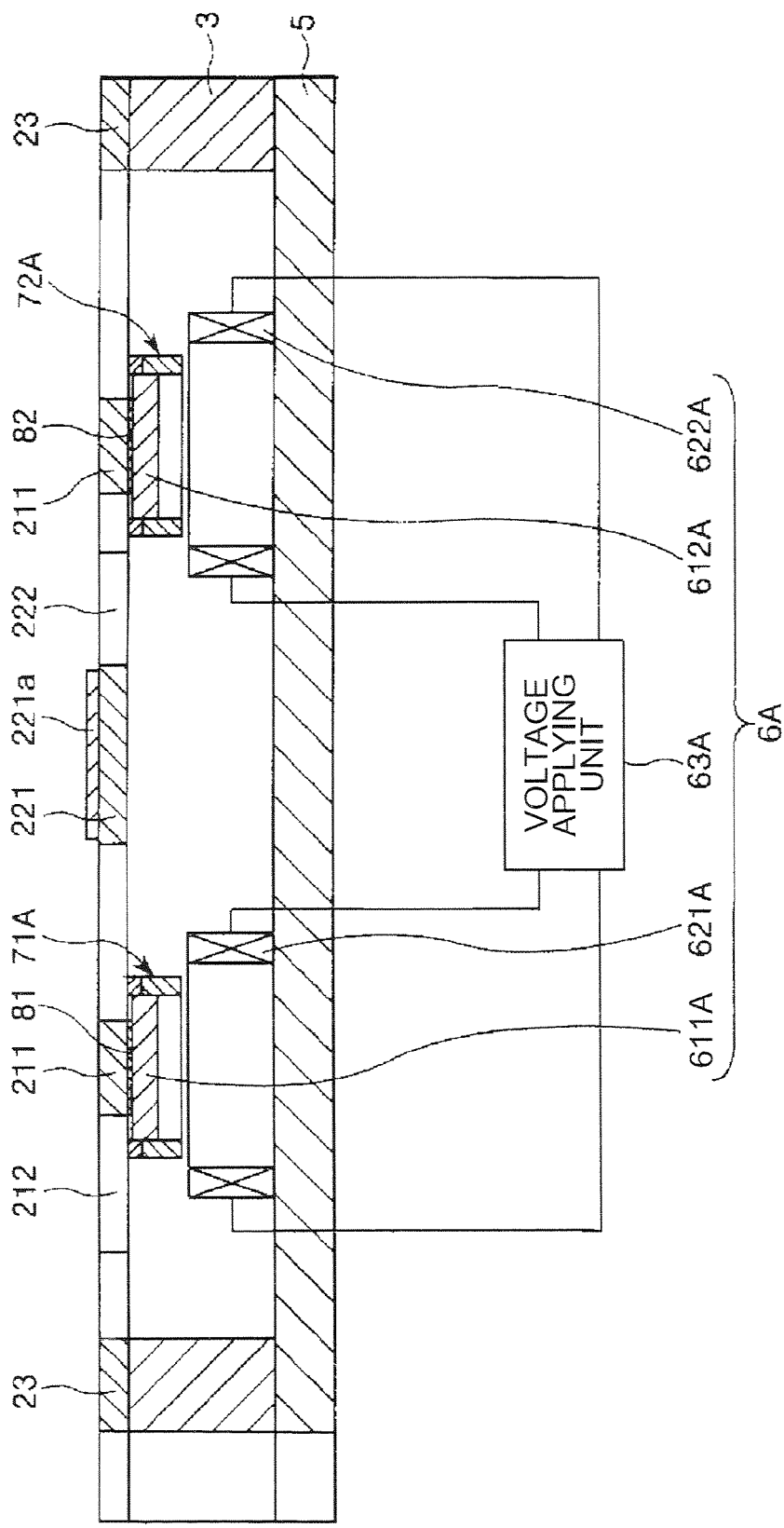
FIG. 8 is a sectional view taken along a line A-A of FIG. 7.
Figure 9:
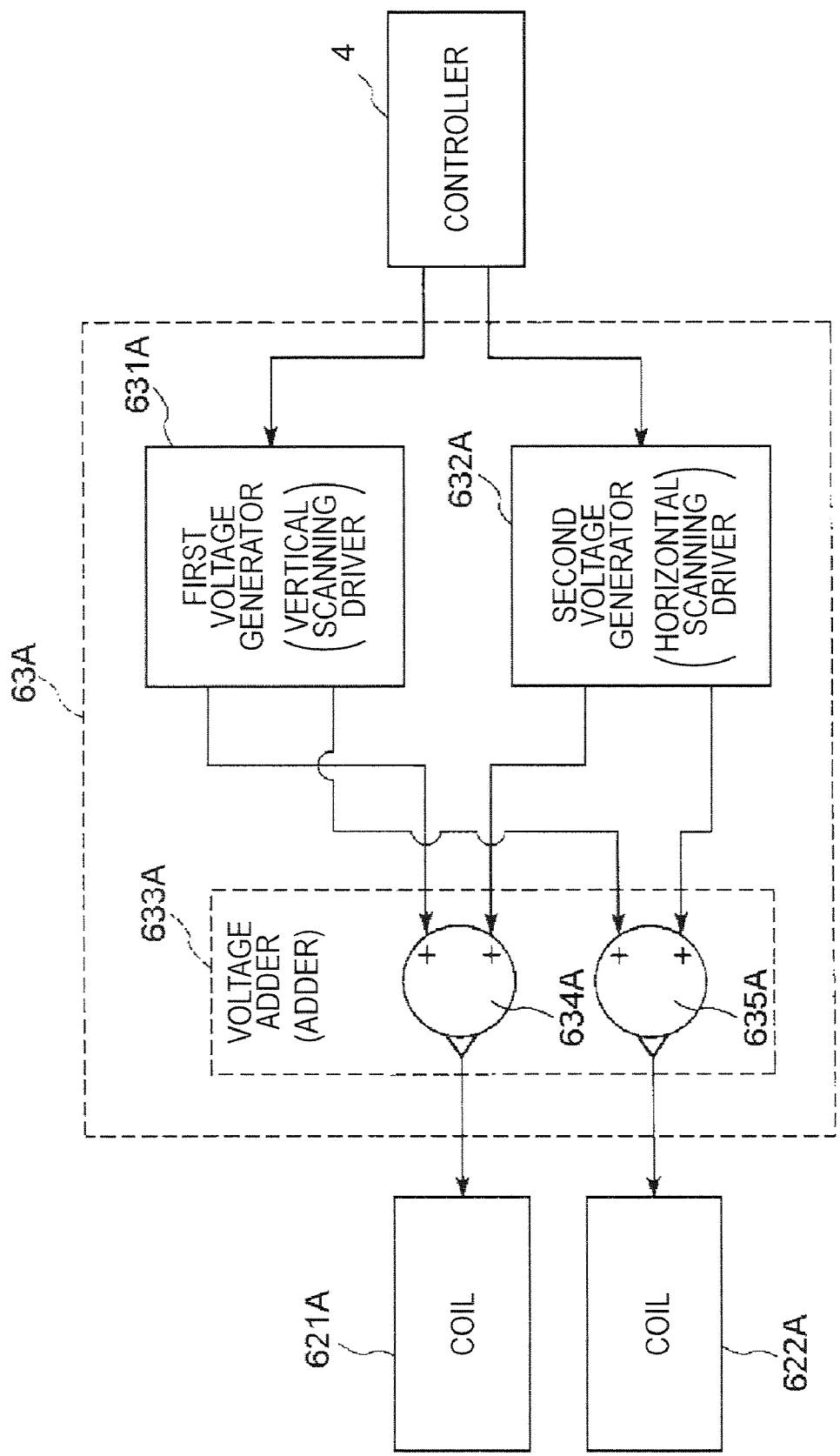
FIG. 9 is a block diagram illustrating a voltage applying unit of a driving unit included in the actuator shown in FIG. 7.
Figure 10:
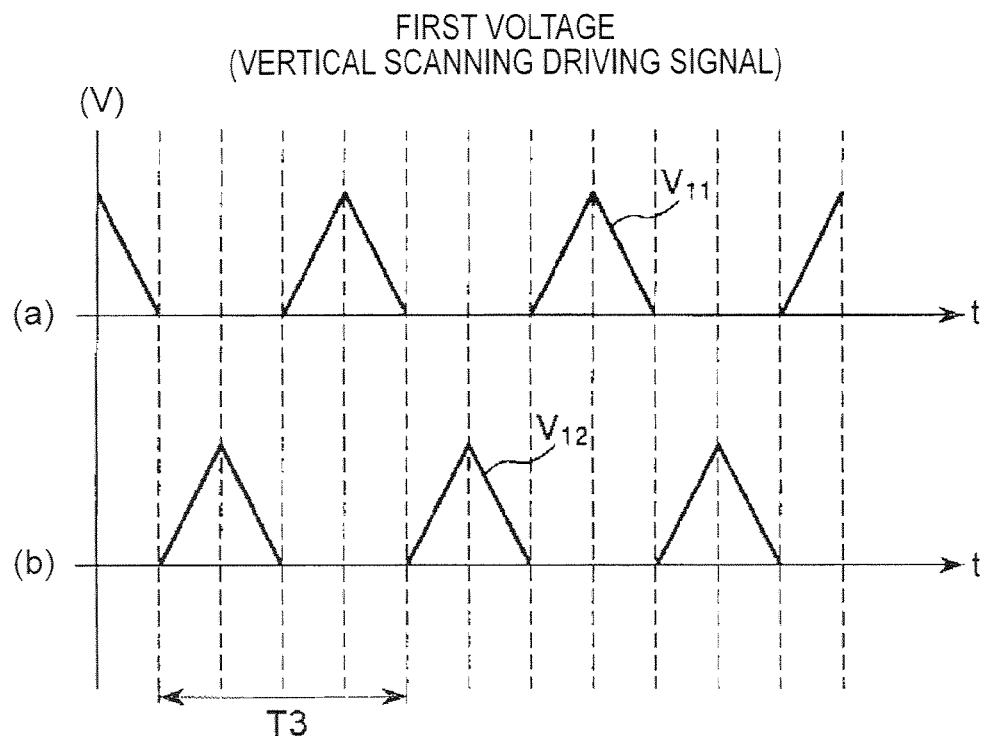
FIGS. 10A to 10D show examples of voltages generated in a first voltage generator and a second voltage generator shown in FIG. 9.
Figure 10:
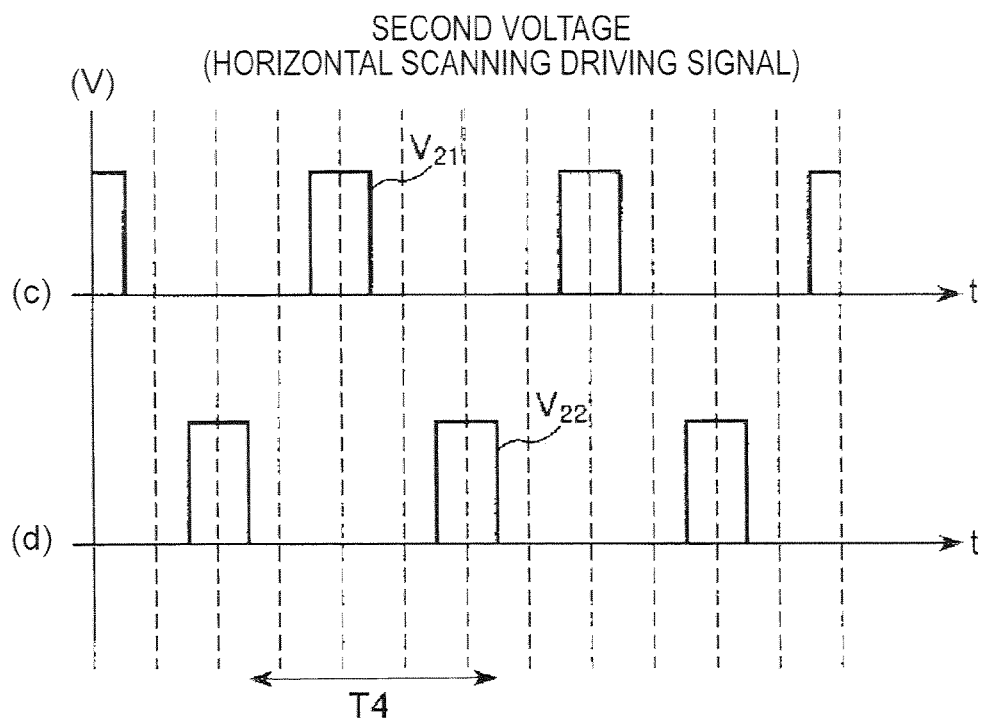

FIG. 7 is a plan view of the actuator of the second embodiment of the invention. FIG. 8 is a sectional view taken along the line A-A of FIG. 7. FIG. 9 is a block diagram illustrating a driving unit included in the actuator shown in FIG. 7. FIGS. 10A to 10D show an example of generated voltage in a first voltage generator and a second voltage generator shown in FIG. 9. For expository convenience, the front side, the rear side, the right side, and the left side in FIG. 7 are described as "up," "down or low," "right," and "left" respectively. Likewise, the top side, the bottom side, the right side, and the left side in FIG. 8 are described as "up," "down or low," "right," and "left" respectively.

The following description of an actuator 1A of the second embodiment focuses primarily on differences from the actuator 1 of the first embodiment, and similar points will be omitted.

The actuator 1A of the second embodiment is nearly the same as the actuator 1 of the first embodiment except for the shapes of the positioning portions 71A and 72A, and the structure of a driving unit 6A. The same numeral is given to the same structure of the first embodiment, in FIGS. 7 to 10D.

A pair of positioning portions 71A and 72A is formed on the lower surface of the driving member 211. The pair of positioning portions 71A and 72A has the same shape and dimension each other.

The positioning portion 71A is formed so as to surround the outer circumference of a soft magnetic member 611A in plan view of FIG. 7. That is, the positioning portion 71A determines the fixing position of the soft magnetic member 611A with respect to the driving member 211. The positioning portion 71A formed to surround the outer circumference of the soft magnetic member 611A allows the soft magnetic member 611A to be accurately fixed at a predetermined position on the driving member 211.

The positioning portion 71A has a ring shape in plan view of FIG. 7 (i.e., in plan view of the movable plate 221). The positioning portion 71A also has an inner diameter larger than the distance between the inner and outer circumferences of the driving member 211.

Likewise, the positioning portion 72A is formed so as to surround the outer circumference of a soft magnetic member 612A in plan view of FIG. 7. That is, the positioning portion 72A determines the fixing position of the soft magnetic member 612A with respect to the driving member 211. The positioning portion 72A formed to surround the outer circumference of the soft magnetic member 612A allows the soft magnetic member 612A to be accurately fixed at a predetermined position on the driving member 211.

The positioning portion 72A has a ring shape in plan view of FIG. 7. The positioning portion 72A also has an inner diameter larger than the distance between the inner and outer circumferences of the driving member 211.

The each shape of the positioning portions 71A and 72A is not particularly limited as long as it can determine each fixing position of the soft magnetic members 611A and 612A. For example, the positioning portion 71A may have an inner diameter smaller than the distance between the inner and outer circumferences of the driving member 211. In addition, the shape of the positioning portion 71A is not limited to a ring shape. For example, it may have a substantially C-shape, i.e., an incomplete ring shape. It may also have a plurality of protrusions provided along the circular direction of the soft magnetic member 611A with an interval so as to surround the outer circumference of the soft magnetic member 611A. The positioning portion 72A may have a shape in accordance with the same manner of the positioning portion 71A as described above.

The positioning portions 71A and 72A are integrally formed with the driving member 211 by using an SOI substrate.

The inside of the positioning portion 71A is referred to as the fixing position of the soft magnetic member 611A while the inside of the positioning portion of the 72A is referred to as the fixing position of the soft magnetic member 612A. Each positioning portion allows each of the soft magnetic members 611A and 612A to be accurately fixed on each predetermined position on the driving member 211. As a result, the actuator 1A can demonstrate desired vibration characteristics.

The soft magnetic member 611A is fixed inside the positioning portion 71A while the soft magnetic member 612A is fixed inside the positioning portion 72A. Each of the pair of soft magnetic members 611A and 612A is disposed apart from each of the rotation center axes X and Y in plan view of FIG. 7.

Specifically, as shown in FIG. 7, the soft magnetic member 612A is fixed at a position, adjacent to the second axial member 222 with respect to the rotation center axis X and adjacent to the first axial member 213 with respect to the rotation center axis Y, of the driving member 211. The soft magnetic member 611A is fixed at a position, adjacent to the second axial member 223 with respect to the rotation center axis X and adjacent to the first axial member 212 with respect to the rotation center axis Y, of the driving member 211.

That is, in the actuator 1, each of the pair of soft magnetic members 611A and 612A is located in the following region among four regions defined by partitioning the driving member 211 with the rotation center axes x and Y in plan view of FIG. 7. The soft magnetic member 611A is located in one region while the soft magnetic member 612A is located in the other region. These two regions are symmetrical with respect to the intersection G (the intersection of the rotation center axes X and Y). This arrangement allows the movable plate 221 to smoothly rotate about each of the rotation axes X and Y.

In addition, the pair of the soft magnetic members 611A and 612A is fixed so as to be symmetrical with respect to the intersection G. This arrangement allows the movable plate 221 to rotate about each of the rotation axes X and Y more smoothly.

In plan view of FIG. 7, a slanting angle θ of a line, connecting each of the pair of the soft magnetic members 611A and 612A and pass through the intersection G, with respect to the rotation center axis X is preferably from 30 to 60 degrees, more preferably from 40 to 50 degrees, and further preferably about 45 degrees. Providing the pair of soft magnetic members 611A and 612A on the line allows the movable plate 221 to rotate about each of the rotation center axes X and Y very smoothly.

The soft magnetic member 611A has a circular disc shape. Because of this shape, the soft magnetic member 611A can be fixed inside the positioning portion 71A very easily in manufacturing the actuator 1.

In addition, the outer shape of the soft magnetic member 611A is nearly equal to the inner circumference shape of the positioning portion 71A in plan view of FIG. 7. This relation allows the soft magnetic member 611A to be disposed at a predetermined position on the driving member 211 very accurately. The soft magnetic member 611A is bonded to the driving member 211 with the adhesive layer 81.

Likewise, the soft magnetic member 612A has a circular disc shape. Because of this shape, the soft magnetic member 612A can be fixed inside the positioning portion 72A very easily in manufacturing the actuator 1.

In addition, the outer shape of the soft magnetic member 612A is nearly equal to the inner circumference shape of the positioning portion 72A in plan view of FIG. 7. This relation allows the soft magnetic member 612A to be disposed at a predetermined position on the driving member 211 very accurately. The soft magnetic member 612A is bonded to the driving member 211 with the adhesive layer 82.

The soft magnetic members 611A and 612A are mainly made of a soft magnetic material. The soft magnetic material is not particularly limited. Examples of the soft magnetic material include Fe, and various Fe alloys, such as silicon pig iron, permalloy, amorphous alloy, and sendust alloy.

As shown in FIG. 8, a coil 621A to magnetize the soft magnetic member 611A is provided directly under the soft magnetic member 611A. Likewise, a coil 622A to magnetize the soft magnetic member 612A is provided directly under the soft magnetic member 612A. The soft magnetic member 611A can be efficiently magnetized by a magnetic field generated from the coil 621A while the soft magnetic member 612A can be efficiently magnetized by a magnetic field generated from the coil 622A. As a result, the actuator 1A can be downsized and lower powered.

The coil 621A to magnetize the soft magnetic member 611A is provided directly under the soft magnetic member 611A. Likewise, the coil 622A to magnetize the soft magnetic member 612A is provided directly under the soft magnetic member 612A.

The coils 621A and 622A are electrically coupled to a voltage applying unit 63A. The voltage applying unit 63A applies a voltage to the coils 621A and 622A, each of which generates a magnetic field having magnetic fluxes along an axis perpendicular to each of the rotation center axes X and Y. The soft magnetic member 611A magnetized by a magnetic field generated from the coil 621A is attracted to the coil 621A while the soft magnetic member 612A magnetized by a magnetic field generated from the coil 622A is attracted to the coil 622A.

As shown in FIG. 9, the voltage applying unit 63A is provided with a first voltage generator 631A, a second voltage generator 632A, and a voltage adder 633A. The first voltage generator 631A generates a first voltage for rotating the movable plate 221 about the rotation center axis X while the second voltage generator 632A generates a second voltage for rotating the movable plate 221 about the rotation center axis Y. The voltage adder 633A adds the first voltage and the second voltage so as to apply the resulting voltage to the coils 621A and 622A.

The first voltage generator 631A generates a voltage (vertical scanning voltage) periodically varying with a period T3, as shown in FIGS. 10A and 10B. Specifically, the first voltage generator 631A generates two kinds of voltage having a frequency (1/T3), i.e., first voltages V11 and V12.

The first voltages V11 and V12 are applied like a pulse. The first voltages V11 and V12 have the same waveform. The first voltage V12 has a 180 degree phase difference from the first voltage V11. The first voltages V11 and V12 allow the actuator 1A to perform a vertical scanning (sub-scanning) of light effectively. Each waveform of the first voltages V11 and V12 is not limited to the one described above as long as it allows the movable plate 221 to rotate about the rotation center axis X.

The frequency of the first voltages V11 and V12 is not particularly limited as long as it is favorable for the vertical scanning. It is preferable from 30 Hz to 80 Hz (about 60 Hz). In the embodiment, the frequency of the first voltages V11 and V12 is adjusted so as to differ from the torsional resonance frequency of the first vibration system 21 composed of the driving member 211, and the pair of first axial members 212 and 213.

On the other hand, the second voltage generator 632A generates a voltage (horizontal scanning voltage) periodically varying with a period T4 different from the period T3, as shown in FIGS. 10C and 10D. Specifically, the second voltage generator 632A generates two kinds of voltage having a frequency (1/T4), i.e., second voltages V21 and V22.

The second voltages V21 and V22 are applied like a pulse. The second voltages V21 and V22 have the same waveform. The second voltage V22 has a 180 degree phase difference from the second voltage V21. The second voltages V21 and V22 allow the actuator 1A to perform a horizontal scanning (main-scanning) of light effectively.

The frequency of the second voltages V21 and V22 is not particularly limited as long as it is different from the frequency of the first voltages V11 and V12 and favorable for the horizontal scanning. It is preferable from 10 kHz to 40 kHz. With the condition in which the frequency of the second voltages V21 and V22 is from 10 kHz to 40 kHz, and the frequency of the first voltages V11 and v12 is about 60 Hz, the movable plate 221 can rotate each of the rotation center axes X and Y at a frequency suitable for display drawing.

The frequency of the second voltages V21 and V22 is adjusted so as to be equal to the torsional resonance frequency of the second vibration system 22 composed of the movable plate 221, and the pair of second axial members 222 and 223. As a result, the movable plate 221 can rotate about the rotation center axis Y with a large rotation angle.

The first voltage generator 631A and the second voltage generator 632A are coupled to the controller 4, which drives them with a signal. The first voltage generator 631A and the second voltage generator 632A are coupled to the voltage adder 633A.

The voltage adder 633A is provided with an adder 634A for applying a voltage to the coil 621A and an adder 635A for applying a voltage to the coil 622A.

The adder 634A receives the first voltage V11 from the first voltage generator 631A and the second voltage V21 from the second voltage generator 632A, and then adds the voltages so as to apply the added voltage to the coil 621A.

The adder 635A receives the first voltage V12 from the first voltage generator 631A and the second voltage V22 from the second voltage generator 632A, and then adds the voltages so as to apply the added voltage to the coil 622A.

The actuator 1A structured described as above is driven as follows. In the embodiment, as described above, the frequency of the first voltages V11 and V12 is set as a value different from the torsional frequency of the first vibration system 21 while the frequency of the second voltages V21 and V22 is set equal to the torsional frequency of the second vibration system 22 and set as larger than the frequency of the first voltages V11 and V12. For example, the frequency of the first voltages V11 and V12 is 60 Hz and the frequency of the second voltages V21 and V22 is 15 kHz.

The first voltage V11 shown in FIG. 10A and the second voltage V21 shown in FIG. 10C are added, for example. The added voltage (referred to as a "voltage V31") is applied to the coil 621A. In sync with adding the voltages, the first voltage V12 shown in FIG. 10B and the second voltage V22 shown in FIG. 10D are added. The added voltage (referred to as a "voltage V32") is applied to the coil 622A.

Upon applying the voltages, two magnetic fields are alternately switched. One magnetic field (referred to as a "magnetic field C1"), generated by a voltage corresponding to the first voltage V11 of the voltage V31, tends to attract the vicinity of the soft magnetic member 611A of the driving member 211 to the coil 621A. The other magnetic field (referred to as a "magnetic field C2"), generated by a voltage corresponding to the first voltage V12 of the voltage V32, tends to attract the vicinity of the soft magnetic member 612A of the driving member 211 to the coil 622A.

In plan view of FIG. 7, the soft magnetic member 611A is fixed at one side while the soft magnetic member 612A is fixed at the other side, with respect to the rotation center axis X on the driving member 211. Because of this arrangement, the driving member 211 rotates together with the movable plate 221 about the rotation center axis X at the frequency of the first voltages V11 and V12 while twisting the first axial members 212 and 213 when the magnetic fields C1 and C2 are alternately switched.

The frequency of the first voltages V11 and V12 is set as enormously lower than the frequency of the second voltages V21 and V22. The resonance frequency of the first vibration system 21 is designed so as to be lower than the resonance frequency of the second vibration system 22 (for example, 1/10 or less of the resonance frequency of the second vibration system 22). That is, the first vibration system 21 rotates about the rotation center axis X by the first voltages V11 and V12 since it is designed that the first vibration system 21 more easily vibrates than the second vibration system 22. That is, this design can prevent the driving member 211 from being rotated about the rotation center axis X by the second voltages V21 and V22.

On the other hand, one magnetic field (referred to as a "magnetic field D1"), generated by a voltage corresponding to the second voltage V21 of the voltage V31, tends to attract the vicinity of the soft magnetic member 611A of the driving member 211 to the coil 621A. The other magnetic field (referred to as a "magnetic field D2"), generated by a voltage corresponding to the second voltage V22 of the voltage V32, tends to attract the vicinity of the soft magnetic member 612A of the driving member 211 to the coil 622A. These two magnetic fields are alternately switched.

In plan view of FIG. 7, the soft magnetic member 611A is fixed at one side while the soft magnetic member 612A is fixed at the other side, with respect to the rotation center axis Y on the driving member 211. Because of this arrangement, the movable plate 221 rotates about the rotation center axis Y at the frequency of the second voltages V21 and V22 while twisting the second axial members 222 and 223 when the magnetic fields D1 and D2 are alternately switched.

The frequency of the second voltages V21 and V22 is equal to the torsional resonance frequency of the second vibration system 22. That makes it possible to dominantly rotate the movable plate 221 about the rotation center axis Y by the second voltages V21 and V22. That is, the movable plate 221 can be prevented from being rotated about the rotation center axis Y by the first voltages V11 and V12.

As described above, in the actuator 1A, the movable plate 221 can rotate about the rotation center axis X at the frequency of the first voltages V11 and V12 while rotating about the rotation center axis Y at the frequency of the second voltages V21 and V22 by applying the voltage V31 to the coil 621A and the voltage V32 to the coil 622A. The voltage V31 is obtained by adding the first voltage V11 and the second voltage V21 while the voltage V32 is obtained by adding the first voltage V12 and the second voltage V22. As a result, the movable plate 221 can rotate about each of the rotation center axes X and Y while achieving low costs and downsizing.

In the embodiment, the actuator 1A is provided with the pair of soft magnetic members 611A and 612A. This structure allows the movable plate 221 to rotate about the rotation center axis X with the frequency of the first voltages V11 and V12 while rotating about the rotation center axis Y with the frequency of the second voltages V21 and V22 smoothly.

In addition, the pair of soft magnetic members 611A and 612A is fixed to the driving member 211 so as to be symmetrical with respect to the intersection G. This structure allows the movable plate 221 to rotate about the rotation center axis X with the frequency of the first voltages V11 and V12 while rotating about the rotation center axis Y with the frequency of the second voltages V21 and V22 more smoothly.

While the pair of soft magnetic members 611A and 612A is fixed to the driving member 211 in the embodiment, the number of soft magnetic members is not limited as long as they the movable plate 221 can be rotated about each of the rotation center axes X and Y. For example, one soft magnetic member may be disposed at a position apart from each of the rotation center axes X and Y in plan view of the movable plate 221.

The second embodiment can achieve the same effects of the first embodiment.

Third Embodiment

Next, an actuator according to a third embodiment of the invention will be described.

Figure 11:
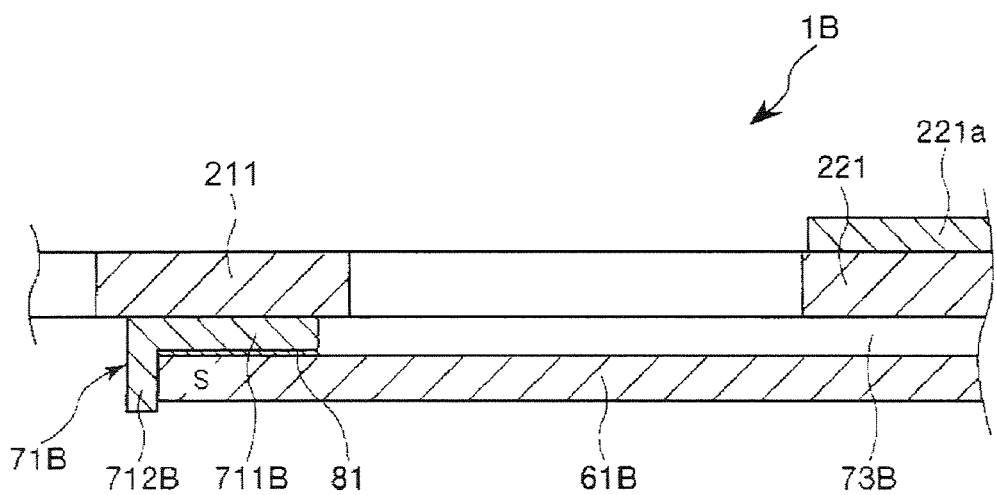
FIG. 11 is a sectional view of an actuator of a third embodiment of the invention.

FIG. 11 is an enlarged view illustrating a positioning portion included in the actuator of the third aspect of the invention. For expository convenience, the top side in FIG. 11 is described as "up," while the bottom side is described as "down or low."

The following description of an actuator 1B of the third embodiment focuses primarily on differences from the actuator 1 of the first embodiment, and similar points will be omitted.

The actuator 1B of the third embodiment is nearly the same as the actuator 1 of the first embodiment except for the shapes of positioning portions 71B and 72B. The same numeral is given to the same structure of the first embodiment, in FIG. 11. The positioning portion 71B is representatively described while the description of the positioning portion 72B is omitted since the positioning portions 71B and 72B have the same structure.

The positioning portion 71B will be described with reference to FIG. 11. FIG. 11 is a sectional view taken along the line A-A in FIG. 1.

The positioning portion 71B is provided with a spacer 711B and a wall portion 712B formed so as to protrude in the lower direction in FIG. 11. The spacer 711B forms a space 73B to avoid making contact between the movable plate 221 and a permanent magnet 61B. The permanent magnet 61B is bonded to the lower surface of the spacer 711B with the adhesive layer 81 interposed therebetween.

The positioning portion 71B having such shape allows the permanent magnet 61B to be accurately fixed at the fixing position to the driving member 211, and the space 73B to easily formed to avoid making contact between the movable plate 221 and the permanent magnet 61B. This structure requires no recess formed on the upper surface of the permanent magnet 61B, for example. As a result, manufacturing the actuator 1B can be simplified.

In addition, the fixing position of the permanent magnet 61B in a direction perpendicular to each of the rotation center axes X and Y can be determined by adjusting the thickness of the spacer 711B. That is, the permanent magnet 61B can be prevented from being out of a predetermined position in the circular direction, in the radius direction, and the thickness direction of the driving member 211.

The third embodiment can also achieve the same effects of the first embodiment.

The actuators described above can be used for MEMS applied sensors such as acceleration sensors, angular velocity sensors, and optical devices, such as optical scanners, optical switches, and optical attenuators, included in image forming apparatuses such as laser printers, bar code readers, scanning confocal laser microscopes, and imaging displays, for example. The description of an optical scanner according to the invention is omitted since it has the same structure of the actuators described above.

A case in which the actuator 1 is used as an optical scanner for an imaging display will be described as an example of image forming apparatuses with reference to FIG. 12. For expository convenience, the longitudinal direction of a screen S is denoted as a "horizontal direction" and a direction perpendicular to the longitudinal direction is denoted as a "vertical direction". The rotation center axis X is in parallel with the horizontal direction of the screen S while the rotation center axis Y is in parallel with the vertical direction of the screen S.

An image forming apparatus (projector) 9 includes a light source device 91 emitting light such as a laser beam, a plurality of dichroic mirrors 92 and the actuator 1.

The light source device 91 is provided with a red light source device 911 emitting a red light component, a blue light source device 912 emitting a blue light component, and a green light source device 913 emitting a green light component.

Each dichroic mirror 92 is an optical element that combines each light component emitted from each of the red light source device 911, the blue light source device 912, and the green light source device 913.

In the projector 9, each light component emitted from the light source device 91 (the red light source device 911, the blue light source device 912, and the green light source device 913) based on image information from a host computer (not shown) is combined by the dichonic mirrors 92. The combined light is two dimensionally scanned by the actuator 1 to form color images on the screen S.

In the two dimensional scanning, light deflected by the light deflector 221a as a result of the movable plate 221 of the actuator 1 rotating about the rotation center axis Y is scanned in the horizontal direction of the screen S (main scanning). On the other hand, light deflected by the light deflector 221a as a result of the movable plate 221 of the actuator 1 rotating about the rotation center axis X is scanned in the vertical direction of the screen S (sub scanning).

Figure 12:
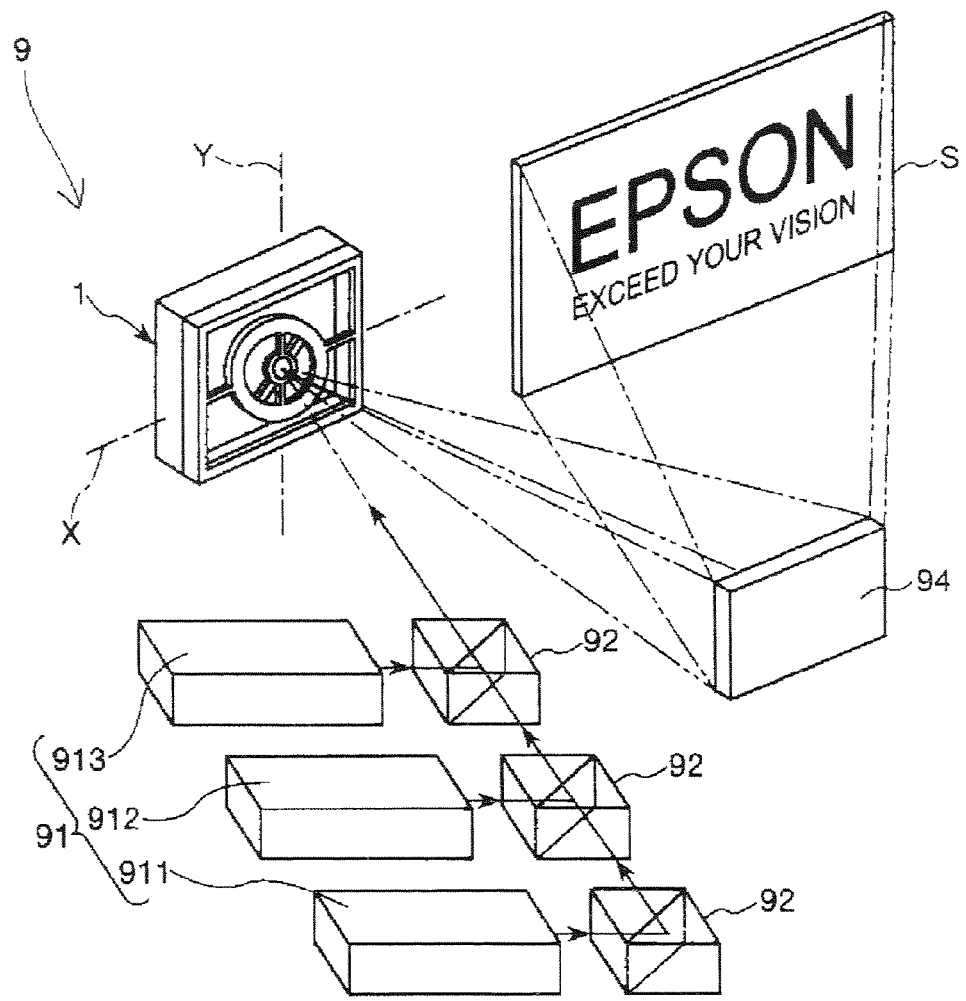
FIG. 12 is a schematic view illustrating an image forming apparatus of a fourth embodiment of the invention.

Light two dimensionally scanned by the actuator 1 may be directly emitted to the screen S without using a fixed mirror 94, while light combined by the dichroic mirrors 92 is two dimensionally scanned by the actuator 1 and then reflected by the fixed mirror 94 to form an image on the screen S in FIG. 12.

While the actuator, the optical scanner, and the image forming apparatus of the invention are described based on the illustrated embodiments thus far, but the invention is not limited to those embodiments. For example, the actuator, the optical scanner, and the image forming apparatus of the invention may include any substitute that has the same function as its original structure and may include any additional structure.

The actuator may be asymmetric with respect to each of the X and Y-axes, while it is about symmetric with respect to each axis in the embodiments.

The ferromagnetic material is not limited to permanent magnets and soft magnetic materials used in the embodiments as long as it can be acted with a magnetic field from the coil. The permanent magnet is one of the ferromagnetic materials and can maintain the characteristic as a magnet for relatively a long period of time without receiving an external supply of current and magnetic field. The soft magnetic material is one of the ferromagnetic materials and substantially has the characteristic as a magnet only when it is magnetized by an external magnetic field.

What is claimed is:

1. An actuator, comprising:
a first vibration system including a driving member having a frame shape, and a pair of first axial members which supports the driving member on a first axis;
a second vibration system including a movable plate provided inside the driving member, and a pair of second axial members which supports the movable plate on a second axis perpendicular to the first axis;
a ferromagnetic member;
a coil generating a magnetic-field acting on the ferromagnetic member and a voltage applying unit applying a voltage to the coil; and
a positioning portion disposed on the driving member and setting a fixing position of the ferromagnetic member or the coil with respect to the driving member;
wherein either one of the ferromagnetic member and the coil is disposed at a position on the driving member apart from each of the first and second axes in a plan view of the movable plate,
the movable plate rotates about each of the first and second axes by the voltage applying unit applying a voltage to the coil, and
the positioning portion includes a spacer which forms a space between the movable plate and the ferromagnetic member.

2. The actuator according to claim 1, wherein the positioning portion is integrally formed with the driving member.

3. The actuator according to claim 2, wherein the driving member is formed from one of a Si layer of an SOI (silicon on insulator) substrate while the positioning portion is formed from at least a $SiO_2$ layer, the SOI substrate having the one Si layer, the other Si layer and the $SiO_2$ layer.

4. The actuator according to claim 1, wherein the driving member is provided with the ferromagnetic member that is a permanent magnet having a longitudinal shape and provided so that a line connecting both poles of the magnet passes through an intersection of the first and second axes and slants with respect to each of the first and second axes.

5. The actuator according to claim 4, wherein both ends of the permanent magnet in a longitudinal direction thereof are fixed to the driving member and the positioning portion is provided as one pair so as to determine a fixing position of the both ends of the permanent magnet in the longitudinal direction.

6. The actuator according to claim 5, wherein the pair of positioning portions is formed so as to oppose each other across the permanent magnet in the longitudinal direction of the permanent magnet and so that a separation distance of the positioning portions is nearly equal to a length of the permanent magnet.

7. The actuator according to claim 5, wherein each positioning portion includes a pair of counter portions so as to oppose each other with the permanent magnet interposed therebetween in a width direction of the permanent magnet, and a separation distance between the pair of counter portions is nearly equal to a width length of the permanent magnet.

8. The actuator according to claim 1, wherein the driving member is provided with the ferromagnetic member that is a soft magnetic member, and the positioning portion is provided so as to surround an outer circumference of the soft magnetic member in a plan view of the movable plate.

9. The actuator according to claim 8, wherein the soft magnetic member has a circular shape in the plan view of the movable plate.

10. The actuator according to claim 8, wherein the soft magnetic member is provided as one pair in two regions symmetrical with respect to the intersection of the first and second axes, the two regions being included in four regions partitioned by the first and second axes in the plan view of the movable plate, and the coil is provided as one pair so as to oppose each soft magnetic member.

11. The actuator according to claim 10, wherein the pair of soft magnetic members is provided so as to be symmetrical with respect to the intersection of the first and second axes in the plan view of the movable plate.

12. The actuator according to claim 1, wherein the voltage applying unit includes a voltage generator generating a first voltage and a second voltage each of which varies periodically with a frequency different from each other, and a voltage adder adding the first voltage and the second voltage, and applies the added voltage to the coil to rotate the movable plate about the first axis at a frequency of the first voltage and about the second axis at a frequency of the second voltage.

13. The actuator according to claim 12, wherein the frequency of the second voltage is equal to a resonance frequency of the second vibration system while the frequency of the first voltage is different from a resonance frequency of the first vibration system.

14. The actuator according to claim 1, wherein the movable plate has a light reflector having light reflection property.

15. An optical scanner, comprising:
a first vibration system including a driving member having a frame shape, and a pair of first axial members which supports the driving member on a first axis;
a second vibration system including a movable plate that is provided inside the driving member and has a light reflector having light reflection property, and a pair of second axial members which supports the movable plate on a second axis perpendicular to the first axis;
a ferromagnetic, member;
a coil generating a magnetic field acting on the ferromagnetic member and a voltage applying unit applying a voltage to the, coil; and
a positioning portion disposed on the driving member and setting a fixing position of the ferromagnetic member or the coil with respect to the driving member;
wherein either one of the ferromagnetic member and the coil is disposed at a position on the driving member apart from each of the first and second axes in a plan view of the movable plate,
the movable plate rotates about each of the first and second axes by the voltage applying unit applying a voltage to the coil, and the positioning portion includes a spacer which forms a space between the movable plate and the ferromagnetic member.

16. An image forming apparatus, comprising a scanner including:
- a first vibration system including a driving member having a frame shape, and a pair of first axial members which supports the driving member on a first axis;
- a second vibration system including a movable plate that is provided inside the driving member and has a light reflector having light reflection property, and a pair of second axial members which supports the movable plate on a second axis perpendicular to the first axis;
- a ferromagnetic, member;
- a coil generating a magnetic field acting on the ferromagnetic material and a voltage applying unit applying a voltage to the coil; and
- a positioning portion disposed on the driving member and setting a fixing position of the ferromagnetic member or the coil with respect to the driving member;

wherein either one of the ferromagnetic member and the coil is disposed at a position on the driving member apart from each of the first and second axes in a plan view of the movable plate, the movable plate rotates about each of the first and second axes by the voltage applying unit applying a voltage to the coil, and the positioning portion includes a spacer which forms a space between the movable plate and the ferromagnetic member.

* * * * *